(12) United States Patent
Graves et al.

(10) Patent No.: US 11,605,026 B2
(45) Date of Patent: Mar. 14, 2023

(54) METHODS AND SYSTEMS FOR SUPPORT POLICY LEARNING

(71) Applicants: Daniel Mark Graves, Edmonton (CA); Jun Jin, Edmonton (CA); Jun Luo, Toronto (CA)

(72) Inventors: Daniel Mark Graves, Edmonton (CA); Jun Jin, Edmonton (CA); Jun Luo, Toronto (CA)

(73) Assignee: Huawei Technologies Co. Ltd., Shenzhen (CN)

( * ) Notice: Subject to any disclaimer, the term of this patent is extended or adjusted under 35 U.S.C. 154(b) by 377 days.

(21) Appl. No.: 16/875,741

(22) Filed: May 15, 2020

(65) Prior Publication Data

US 2021/0357782 A1 Nov. 18, 2021

(51) Int. Cl.
*G06N 20/00* (2019.01)
(52) U.S. Cl.
CPC .................... *G06N 20/00* (2019.01)
(58) Field of Classification Search
None
See application file for complete search history.

(56) References Cited

U.S. PATENT DOCUMENTS

| | | | | |
|---|---|---|---|---|
| 10,766,137 | B1 * | 9/2020 | Porter | B25J 9/161 |
| 10,792,810 | B1 * | 10/2020 | Beckman | B25J 9/163 |
| 10,800,040 | B1 * | 10/2020 | Beckman | B25J 9/1671 |
| 10,926,408 | B1 * | 2/2021 | Vogelsong | B25J 9/1671 |
| 11,366,433 | B2 * | 6/2022 | Iwane | G05B 13/0265 |
| 2010/0114807 | A1 | 5/2010 | Ueda et al. | |
| 2020/0134505 | A1 | 4/2020 | Jang et al. | |

FOREIGN PATENT DOCUMENTS

| | | |
|---|---|---|
| CN | 102819264 A | 12/2012 |
| CN | 102929281 A | 2/2013 |
| CN | 107292344 A | 10/2017 |

OTHER PUBLICATIONS

J. Van den Berg, M. Lin, and D. Manocha, "Reciprocal velocity obstacles for real-time multi-agent navigation," in 2008 IEEE International Conference on Robotics and Automation. IEEE, pp. 1928-1935 2008.
S. S. P. Narvekar, "Learning curriculum policies for reinforcement learning," in AAMAS, Montreal 2019.

(Continued)

*Primary Examiner* — Ronald Laneau

(57) ABSTRACT

Methods and systems are described for support policy learning in an agent of a robot. A general value function (GVF) is learned for a main policy, where the GVF represents future performance of the agent executing the main policy for a given state of the environment. A master policy selects an action based on the predicted accumulated success value received from the general value function. When the predicted accumulated success value is an acceptable value, the action selected by the master policy is execution of the main policy. When the predicted accumulated success value is not an acceptable value, the master action causes a support policy to be learned. The support policy generates a support action to be performed which causes the robot to transition from to a new state where the predicted accumulated success value has an acceptable value.

20 Claims, 10 Drawing Sheets

(56) References Cited

OTHER PUBLICATIONS

Lazaric, "Reinforcement Learning—State of the art," in Transfer in reinforcement learning: a framework and a survey, Springer, pp. 143-173 2012.

Y. L. J. C. R. W. J. Bengio, "Curriculum Learning," in ICML, Montreal 2009.

A. V. M. R. T. H. N. P. R. H. R. Rusu, "Sim-to-real robot learning from pixels with progressive nets," in CoRL, Mountain View 2017.

T. Dietterich, "Hierarchical reinforcement learning with the MAXQ value function decomposition," Journal of Artificial Intelligence Research, vol. 13, No. 1, pp. 227-303 2000.

R. Sutton, J. Modayil, M. Delp, T. Degris, P. Pilarski, A. White and D. Precup, "Horde: A scalable real-time architecture for learning knowledge from unsupervised sensorimotor interaction," in Proc. of 10th Intl. Conf. on Autonomous Agents and Multiagent Systems, Taipei, Taiwan 2011.

\* cited by examiner

METHODS AND SYSTEMS FOR SUPPORT POLICY LEARNING

FIELD

The present disclosure relates to methods of support policy learning in a robot configured with a reinforcement learning (RL) agent, particularly support policy learning for improving generality and utilization of existing policies.

BACKGROUND

Presently, robotic control systems with an existing algorithm or solution for solving a particular task may not be capable of generalizing the existing solution into one that can solve a broader set of similar tasks within the same environment.

Existing solutions may include machine-learned solutions that have been achieved with reinforcement learning (RL), which, in the context of artificial intelligence (AI), has been historically implemented using dynamic programming that learns functions using a system of rewards. Generally, an agent of a robot that executes a reinforcement learning (RL) algorithm (hereinafter called a RL agent) excels at solving tasks tabular rasa by exploring an environment, collecting states, performing an action within the environment based on a policy, receiving changes in the state of the environment and corresponding reward, and improving the policy to maximize its reward return. However, as the problem complexity increases, as in the case of solution generalization, RL agents may begin to fail and become increasingly difficult to train.

Some challenges may include the following. Large or infinite state and action spaces, which are characteristic of the environment for a complex problem, may be difficult for an RL agent to explore. Sample inefficiency, where training of the RL agent may be time consuming due to inefficient sampling of the possible states, may also be a challenge. Sparse rewards may be a challenge, where not enough different rewards are sampled to improve the behavior of the RL agent over a range of different states. Credit assignment may be a challenge, in which, for long time horizon tasks that require long sequences of actions to solve, it is often difficult to associate a reward with the source task that led to an improvement. Transfer learning may be another challenge, where it is difficult to apply a learned policy to either a related problem or the same problem but in different environments, including simulation to real world (sim-to-real) transfer.

The usual approach to dealing with large or infinite state and action spaces is to apply function approximation, such as deep learning, to learn features that represent the state more compactly. However, this often further exacerbates the problem of sample inefficiency since deep neural networks typically require many samples to train effectively.

Another common method of attempting to address some of the above-mentioned challenges is applying a curriculum learning method to the RL agent to derive a learned solution, particularly for complex tasks with large state and action spaces, longer time horizon tasks, and sparse reward tasks. A well-designed curriculum, such as one provided by an expert, has several advantages. For example, curriculum learning generally breaks down a task in to a sequence of smaller tasks to solve in order of increasing complexity, which allows the RL agent to focus on solving simpler tasks before moving onto more complex tasks. Accordingly, the RL agent may learn more quickly since the curriculum guides the agent in solving simpler tasks first before tackling the complex ones. The key insight with a curriculum is that, instead of tabular rasa, the solution to the complex problem can reuse knowledge from previous simpler problems. Learning with a curriculum is an instance of transfer learning where a sequence of progressively complex problems are developed and the agent must transfer knowledge of solutions to early tasks to later tasks.

However, a challenge to using transfer learning is catastrophic forgetting. Catastrophic forgetting, or catastrophic interference, happens when the parameters of a solution to a task in one domain are updated to optimize the solution for a new task in another domain, but the updated solution becomes unable to, or "forgets", how to solve the original task. One approach to mitigate this catastrophic forgetting issue is with progressive networks, which may achieve transfer with progressive networks by training an agent in a simulated environment, fixing the network and sharing the features learned to speed up training of a parallel network on the real-world task.

Many of the above-mentioned and similar solutions are directed at leveraging existing solutions of simpler tasks to speed up learning in more complex tasks. However, the existing solutions often perform well only when certain conditions and assumptions are met. The existing solutions typically usually do not solve the entire problem, particularly in situations where the conditions and assumptions are not met.

It would be desirable to achieve end-to-end learning, in which the RL agent learns a general solution to solve a given problem without (or with a minimum number of) conditions and assumptions. Given the challenges in applying RL to complex problems such as those mentioned above, general end-to-end solutions do not yet exist for many problems.

SUMMARY

The present disclosure describes methods and systems that may be implemented to achieve end-to-end RL solutions to a complex task by efficiently reusing existing solutions, regardless of whether an existing solution was learned with RL or hand-engineered, within the same action space and state spaces of the environment.

In at least one aspect, the present disclosure relates to a method of support policy learning (SPL). Specifically, existing solution(s) to simpler task(s), no matter if it was learned with RL or hand-engineered, are treated as black box(es) and reused to solve broader and more complex tasks quickly and efficiently despite any limitations or assumptions the existing solution(s) may have. In some examples, the SPL may be less susceptible to catastrophic forgetting, at least because the exiting solutions are retained and fixed to be re-used.

In some example aspects, the present disclosure describes a method performed by an agent of a robot that controls the robot to interact with an environment, the method comprising: receiving a main policy, the main policy generating an action to be performed by the robot based on a state of the robot, wherein performance of the agent executing the main policy is measured by an accumulated success value; learning, for the main policy, a general value function using a policy evaluation algorithm, the general value function predicting the accumulated success value representing future performance of the agent executing the main policy for a given state of the environment, the given state being in an overall state space; obtaining a master policy which selects an action based on the predicted accumulated success value received from the general value function; when the predicted accumulated success value is an acceptable value, the action selected by the master policy causes the main policy to be executed, to cause the robot to perform a main action generated by the main policy based on the given state in the state space; when the predicted accumulated success value is not an acceptable value, the action selected by the master policy causes a support policy to be learned, using a reinforcement learning algorithm, the support policy generating a support action to be performed by the robot based on the given state which causes the robot to transition from the given state towards a new state where the predicted accumulated success value has an acceptable value.

In some example aspects, the present disclosure describes a processing unit of a robot, the processing unit executing machine-executable instructions to implement an agent to control the robot to interact with an environment, the instructions causing the agent to: receive a main policy, the main policy generating an action to be performed by the robot based on a state of the robot, wherein performance of the agent executing the main policy is measured by an accumulated success value; learn, for the main policy, a general value function using a policy evaluation algorithm, the general value function predicting the accumulated success value representing future performance of the agent executing the main policy for a given state of the environment, the given state being in an overall state space; obtain a master policy which selects an action based on the predicted accumulated success value received from the general value function; when the predicted accumulated success value is an acceptable value, the action selected by the master policy causes the main policy to be executed, to cause the robot to perform a main action generated by the main policy based on the given state in the state space; when the predicted accumulated success value is not an acceptable value, the action selected by the master policy causes a support policy to be learned, using a reinforcement learning algorithm, the support policy generating a support action to be performed by the robot based on the given state which causes the robot to transition from the given state towards a new state where the predicted accumulated success value has an acceptable value.

In some example aspects, the present disclosure describes a computer readable medium having instructions stored thereon, wherein the instructions, when executed by an agent of a robot that controls the robot to interact with an environment, cause the agent to: receive a main policy, the main policy generating an action to be performed by the robot based on a state of the robot, wherein performance of the agent executing the main policy is measured by an accumulated success value; learn, for the main policy, a general value function using a policy evaluation algorithm, the general value function predicting the accumulated success value representing future performance of the agent executing the main policy for a given state of the environment, the given state being in an overall state space; obtain a master policy which selects an action based on the predicted accumulated success value received from the general value function; when the predicted accumulated success value is an acceptable value, the action selected by the master policy causes the main policy to be executed, to cause the robot to perform a main action generated by the main policy based on the given state in the state space; when the predicted accumulated success value is not an acceptable value, the action selected by the master policy causes a support policy to be learned, using a reinforcement learning algorithm, the support policy generating a support action to be performed by the robot based on the given state which causes the robot to transition from the given state towards a new state where the predicted accumulated success value has an acceptable value.

In any of the above aspects, learning the general value function may comprise: performing a plurality of iterations, each iteration comprising: sampling an action generated by the main policy, based on a current state in the state space, the action being executed by the agent to cause the robot to perform the action; sampling a next state in the state space, after execution of the action; calculating a cumulant based on a transition from the current state to the next state, given the execution of the action, wherein the cumulant is representative of the success value of the agent in the current state; and storing at least the cumulant in association with the current state, the action output, and the next state; and updating the general value function using temporal difference learning.

In any of the above aspects, the general value function is updated using temporal difference learning or Monte Carlo estimation.

In any of the above aspects, the support policy may be learned based on rewards that are based on the predicted accumulated success value received from the general value function, over a plurality of states sampled from the state space.

In any of the above aspects, determining the master policy may comprise determining a threshold value, and wherein the master policy is defined to select the main policy to be executed when the success value outputted by the general value function passes the threshold value, and is further defined to cause the support policy to be learned when the success value outputted by the general value function fails to pass the threshold value.

In any of the above aspects, determining the master policy may comprise learning the master policy together with learning of the support policy, the learning of the master policy being based on a master policy reward and the learning of the support policy being based on a support policy reward, the master policy reward and the support policy reward each being separately based on the predicted accumulated success value received from the general value function.

In any of the above aspects, the general value function, the master policy and the support policy may be learned concurrently.

BRIEF DESCRIPTION OF THE DRAWINGS

For a more complete understanding of example embodiments, and the advantages thereof, reference is now made to the following detailed description taken in conjunction with the accompanying drawings, in which.

Similar reference numerals may have been used in different figures to denote similar components.

DESCRIPTION OF EXAMPLE EMBODIMENTS

Figure 1:
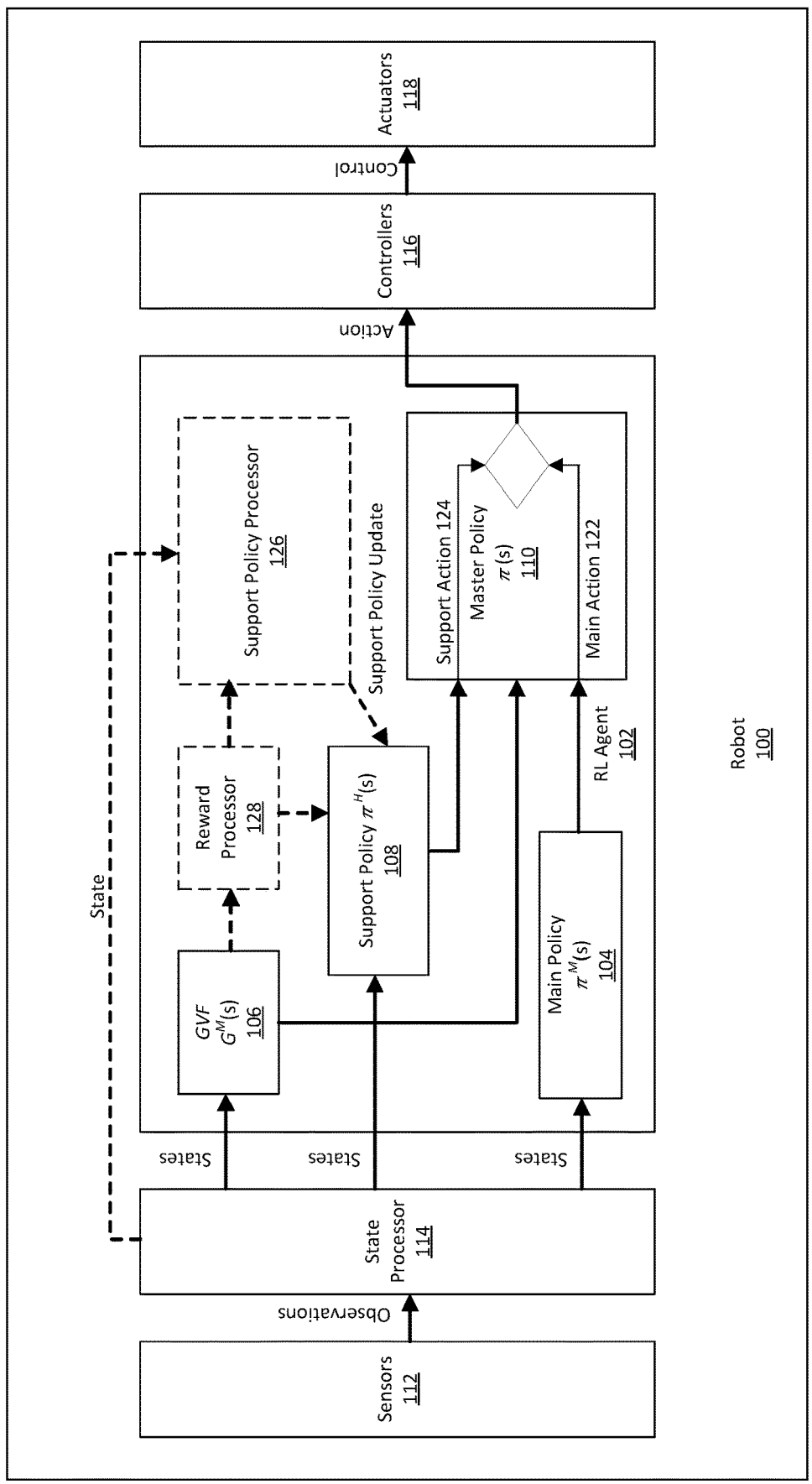
FIG. 1 is a schematic diagram illustrating a robot configured for support policy learning, in accordance with an example embodiment.

The following definitions may be used in the present disclosure:

Action: a control decision for interacting with the environment realized by actuators.

Action Space: a set of all possible actions.

Action Value: the expected return of the agent from a given state, next action and a policy followed afterwards.

ADAS: Advanced Driver-Assistance System.

Discount: an exponential decay factor that weights the importance of future rewards.

GVF: General Value Function.

MC: Monte Carlo estimation.

MDP: Markov Decision Process defined by State Space, Action Space, Transition model, and Reward.

Observation: a description of the environment captured through sensors or produced by other sources.

POMDP: Partially Observable Markov Decision Process defined by State Space, Action Space, Transition model, Reward, Observation Space, and Observation distribution conditioned on state that maps state to observations.

Sim-to-real: transfer a policy learned in simulation to the real-world.

State: a description of the environment that is sufficient to predict future states in the environment given an action without any other information, i.e. no historical states are needed.

State Space: a set of all possible states.

TD: temporal difference estimation.

Trajectory: a sequence of transitions in an environment beginning with an initial state, the action taken in that state, the reward received, and next state received, next action taken, until the last state is received.

Transfer: taking knowledge from a solution to one task and re-using it in another task.

Transition: a collection of state, action, reward and next state.

Policy: a decision rule that specifies an action given a state.

Return: sum of future rewards when executing a policy in an environment.

Reward: a signal in the environment received by the agent as it interacts with the environment providing feedback on quality of the policy.

RL: Reinforcement Learning.

Value: the expected return of the agent from a given state and policy followed.

Example embodiments generally relate to a robot that includes an RL agent that controls the interaction of the robot in an environment. In order to interact with the environment, the RL agent receives the current state of the environment, computes a predicted accumulated success value representing future performance of a main policy for the current state using a general value function that is learned for the main policy, and, selects, based on a decision by a master policy, performs either (1) the main policy and executes a main action generated by the main policy based on the current state; or (2) a support policy and executes a support action generated by the support policy based on the current state.

In some embodiments, the environment is a simulated environment and the RL agent is implemented as one or more computer programs interacting with the simulated environment. For example, the simulated environment may be a video game and the RL agent may be a simulated user playing the video game. As another example, the simulated environment may be a motion simulation environment, e.g., a driving simulation or a flight simulation, and the RL agent is a simulated driver navigating through a motion simulation. In these implementations, the actions may be points in a space of possible control inputs to control the simulated user or simulated driver.

In some other examples, the environment is a real-world environment and the RL agent is a mechanical agent interacting with the real-world environment. For example, the RL agent may be a robot interacting with the environment to accomplish a specific task. As another example, the RL agent may be an autonomous or semi-autonomous vehicle navigating through the environment. In these implementations, the actions may be points in a space of possible control inputs to control the robot or the autonomous vehicle.

FIG. 1 shows a schematic diagram of an exemplary robot 100 that includes an RL agent 102 in accordance with the present disclosure. The RL agent 102 may be implemented by one or more physical processing units of the robot 100, for example by the processing unit(s) executing computer-readable instructions (which may be stored in a memory of the robot 100) to perform methods described herein. It should be noted that FIG. 1 includes elements indicated by dashed line. Such elements may be implemented only during a training phase of the RL agent 102 (e.g., when the RL agent 102 is trained to learn the GVF, learn the support policy and optionally learn the master policy as discussed further below), and may not be implemented when the RL agent 102 is deployed (e.g. when the RL agent 102 operates during an inference phase). The RL agent 102 is provided with a main policy 104 which generates a main action based on a state that is performed by the robot 100. During the training phase, the RL agent 102 is configured to learn a general value function 106 that determines a predicted accumulated success value of the main policy 104 for a given state within the state space S. The RL agent 102 is further configured to learn a support policy 108 that generates a support action based on a state in order to transition the robot 100 from a state where the main policy 104 may not succeed to a state where the main policy 104 would be likely to succeed. The RL agent 102 is also configured to implement or learn a master policy 110 that aims to maximize the success of the main policy 104 by selecting either the main policy 104 or the support policy 108 based on the predicted accumulated success value given the current state.

In general, the main policy 104 may be a routine or a procedure, which when executed by the RL agent 102, receives a current state which is associated with an accumulated success value generates a main action based on the current state, executes the main action which causes the robot 100 to transition from the current state to a new state, which is associated with a new accumulated success value and repeats these steps with the next state as the current state. As will be discussed further below, the main policy 104 is associated with an acceptable accumulated success value for a set of states defining a sub-set in the overall state space (where the robot 100 can be in any state within the state space). For the purposes of the present disclosure, execution of the main action by the RL agent 102 means sending the main action to a controller 116 of the RL agent 102 which generates control signals for one or more actuators 118 of the robot 100 that cause the robot 100 to perform the action in the environment to cause the robot 100 to transition from the current state to a new state.

The robot 100 may be any mechanical device configured to perform a particular action within an environment. For example, the robot 100 may be a mechanical arm tasked to pick out components from a bin, or an autonomous or semi-autonomous vehicle tasked to perform a driving action such as parking, or a robotic entity tasked to navigate a particular environment.

As shown in FIG. 1, the robot 100 includes sensors 112 and a state processor 114. The robot 100 also includes one or more controllers 116 that send control signals to one or more actuators 118.

Each of the sensors 112 are configured to sense the environment and provide observation data representative of an observation of the environment, at a particular point in time, to the state processor 114. In some embodiments, the sensors 112 include cameras, 3D laser scanning sensor(s) (e.g., Light Detection and Ranging (LIDARs)), radar(s), accelerometer(s), gyroscope(s), thermometer(s), etc. The state processor 114 receives the observation data from each of the sensors 112, processes all the received observation data to generate a state s of the environment, and outputs the state s. In some embodiments, the sensors 112 may themselves generate a state s and the state processor 114 may simply relay the state s received from the sensors 112. In some embodiments, some sensors 112 may output raw observation data (which require further processing) to the state processor 114 and other sensors 112 may output data that does not require further processing. The state processor 114 may process the raw observation data and simply add or concatenate the processed result with the other data that does not require processing. As noted above, the set of all possible states s in the environment is referred to as the state space S.

In some embodiments, observation data received from one or more of the sensors 112 may include low-dimensional features that characterize an observation of the environment. In these embodiments, the state processor 114 may perform feature extraction on the observation data received from each of the one or more of the sensors 112, and output low-dimensional feature vectors (which may be more readily processed by the RL agent 102). In these embodiments, values of different dimensions of the low-dimensional feature vectors may have varying ranges.

In some embodiments, observation data of the environment may include a digital image that characterizes an observation of the environment, e.g., image of the simulated environment or image captured by one or more of the sensors 112 (e.g., cameras) as the robot 100 interacts with the real-world environment. In these embodiments, the state processor 114 may perform feature extraction on the digital image included in observation data and output high-dimensional feature vectors (which may be more readily processed by the RL agent 102).

A given state s may be represented by a combination of different data having different dimensionality, different formats and/or different extent of processing (e.g., data or processed feature vectors).

To cause the robot 100 to perform actions, the RL agent 102 implements the master policy 110. The master policy 110 makes a decision whether to execute the main policy 104 or the support policy 108 (or learn the support policy 108, in the training phase as discussed further below), to cause execution of a main action 122 generated by the main policy 104 or a support action 124 generated by the support policy 108. Execution of the main action 122 or the support action 124 causes the RL agent 102 to send the corresponding action to the controller(s) 116, to cause the robots 100 to perform the action. Whether the main policy 104 or the support policy 108 is selected by the master depends on the predicted accumulated success value of the main policy 104 as determined by the GVF 106. The GVF 106 representing the predicted accumulated success value of the main policy 104, for a given state s, may be denoted as $G^M(s)$. The controller(s) 116 are configured to process each respective action received from the RL agent 102 and send a respective control signal to one or more of the actuators 118 to cause the robot 100 to perform the respective action (e.g., motor control, electrical activation, mechanical movement). For example, the controller(s) 116 may include a processing unit (e.g., a microprocessor) that converts actions received from the RL agent 102 into control signals for controlling the actuators 118. For example, if an action received from the RL agent 102 is to increase acceleration, then the controller(s) 116 may convert the action into a control signal (e.g., a voltage signal) that increases the rotation of an actuator 118 such as a motor. Generally, in some example embodiments, the RL agent 102 is configured to extend, or generalize, existing or known knowledge (learnings) required to solve one task to solve another task in a broader context. This reuse of existing knowledge or learnings may be referred to as transfer learning. For example, a task is a problem that needs to be solved in an environment to achieve some sort of goal, which may be measurable by way of maximizing predicted success.

In some embodiments, a main policy 104 of the RL agent 102 is an existing solution to a task. The main policy 104 is denoted by $\pi^M(s)$ and is provided to the RL agent 102. The main policy 104 may be hand-engineered (e.g., manually developed by a human, for example through empirical experience and/or trial-and-error) or a learned solution (e.g., learned through reinforcement learning, using a smaller set of assumed conditions within the larger state space S) configured to solving a task or achieve a goal over a sub-set of states L within the entire state space of S, where L∈S. In other words, the main policy 104 may represent a solution to a simpler task within the same environment. For example, the main policy 104 may represent a solution that has a high likelihood of success for performing the simpler task (i.e., within the sub-set of states L), but has a lower likelihood of success of a more generalized task (i.e., over the rest of the state space S).

In accordance with the present disclosure, the main policy 104 may be treated as a "black box", which may advantageously allow existing solutions to be reused without any tabular rasa learning. Further, catastrophic forgetting may be inhibited by maintaining the main policy 104 without attempting to improve the main policy through learning to expand its utility to the entire state space S. As well, the sub-set of states L where the main policy 104 may succeed need not be known in advance. It should be noted that the sub-set of states L may not be the same as the set of simple states for which the main policy 104 was developed. For example, a main policy 104 may have been hand-engineered to succeed in a very limited intended scenario, however the main policy 104 may in fact be successful in a larger sub-set of states L than the intended scenario. No assumptions need to be made on the structure of state space L where the main policy 104 is successful, even if its geometry may be highly irregular or even separated into several disjoint regions. No assumptions need to be imposed on the main policy 104 as to whether it is learned, e.g. by reinforcement learning, or hand-engineered.

The master policy 110 is configured to maximize the success of the main policy 104. Specifically, the master policy 110 chooses, based on the predicted accumulated success value from GVF 106 in the current state s∈S, either the support policy 108 or the main policy 104 by explicitly constructing the master policy 110 (e.g., using manually-defined rules) or by learning the master policy 110.

Since the master policy 110's decision with respect to which of the main policy 104 or the support policy 108 to execute is based on the predicted accumulated success value, embodiments of the present disclosure may define the sub-set of states L for which the main policy 104 may succeed, using a threshold-based definition of success. To this end, a threshold success value indicative of an acceptable success value may be defined. The GVF 106 may evaluate the main policy 104 over the entire state space S and learn the sub-set of states L on the basis of when the predicted accumulated success value exceeds the acceptable threshold value. Hence, the master policy 110 may execute the main policy 104 for the sub-set of states L (on the basis of when the predicted accumulated success value exceeds the threshold), and may execute the support policy 108 for all other states outside of L.

In some embodiments, more complex decision making may be performed by the master policy 110. For example, in a multi-objective optimization problem where multiple GVF functions $G_1^M(s), G_2^M(s) \ldots G_N^M(s)$ (for some integer N>1), with possibly different cumulants and/or different discount factors, may be needed to assess the success of the main policy 104 in accomplishing multiple objectives. As another example, there may be one or more additional policies other than the main policy 104 and the support policy 108 from which the mater policy 110 may choose for execution. In such cases, the master policy 110 may be learned using a RL algorithm, which may permit inclusion of auxiliary information in learning the master policy 110.

Thus, at least in one aspect, the goal for the RL agent 102 is to learn a support policy 106, denoted by $\pi^H(s)$, that generates a support action to transition the RL agent 102 from a first state (s∉L) where the main action 122 generated by the main policy 104 is likely to lead to an unsuccessful outcome (as predicted by the GVF 106) to a second state (s∈L) where the main action 122 generated by the main policy 104 is likely to lead to a successful outcome (as predicted by the GVF 106). Together, both of the support policy 106 and main policy 104, with selection by the master policy 110, may offer a more general solution to the task that can be applied to a broader state space S.

In exemplary embodiments, it may be assumed that a value function $Q^M(s, a)$, which is typically configured to evaluate a reward value associated with a particular state s and a main action 122 of the main policy 104, does not exist or is unknown. Even in embodiments where such value function is available, the existing value function may be ignored at least because the existing value function may not be accurate over the entire state space s∈S, because the existing value function was only trained or designed in the smaller problem sub-set of states L.

In some embodiments, instead of the value function $Q^M(s, a)$, the RL agent 102 is configured to learn the GVF $G^M(s)$ 106 using a policy evaluation algorithm. The GVF $G^M(s)$ 106 predicts an accumulated success value representing future long-term performance (e.g., performance may be based on executing a policy from the current state) of the RL agent 102 executing the main action 122 generated by the main policy 104 for a given state s in the state space S. Functionally, the GVF $G^M(s)$ 106 may be characterized as a proxy for the initiation set of the main policy 104, as the GVF $G^M(s)$ 106 informs the RL agent 102 when the main policy 104 or the support policy 108 should be used. An initiation set is the set of all states that an option can be invoked from and a termination function of the option outputs a probability of termination in a given state. In some examples, the GVF $G^M(s)$ 106 prediction of the future success of the performance of the RL agent 102 executing the main policy 104 can also be used to terminate the main policy 104 when the predicted success is no longer acceptable, which may be determined in various ways. For example, when the predicted success fails to meet a preset threshold value, the main policy 104 may be terminated. In other words, the GVF 106 may provide output that indicates when the main policy 104 should be initiated, as well as when the main policy 104 should be terminated. An option is defined by a policy, termination function and initiation set, and is a policy that can be executed for at least one time step before terminating according to the termination probability output by the termination function in the current state and switching to another option whose initiation set includes the current state. The learning of the GVF $G^M(s)$ 106 results in a function that describes the sub-set of states L where, for example, larger values of the GVF $G^M(s)$ 106 for a given state s may indicate that the given state s is part of the solution sub-set L. In essence, the learning of the GVF $G^M(s)$ 106 may be considered a form of policy evaluation of the main policy 104, but on a larger state space than the one for which the main policy 104 was designed or trained. Details of the GVF $G^M(s)$ 106 learning will be discussed in more detail below.

Although the RL agent 102 may succeed in a first state within the sub-set of states L by executing the main policy 104, when a second state s outside of the sub-set of states L (s∉L) is encountered, execution of the main policy 104 may result in an undesirable result, such as any of the following: producing non-optimal actions, producing constant or random actions, throwing an exception, and/or failing the task.

Thus, as shown in FIG. 1, the RL agent 102 includes a support policy processor 126 configured to execute a RL algorithm to update, or learn, the parameters of the support policy 124 (denoted as $\pi^H(s)$) 108 for transitioning from a state outside of sub-set of states L to another state within the sub-set of states L. The support policy 124 maps states outside of sub-set of states L to support actions and may be modelled as a neural network, for example. Execution of a support action generated by the support policy 124 causes the robot 100 to transition from a state outside of sub-set of states L to another state within the sub-set of states L. In particular, the support policy processor 126 may be configured to maximize the reward received from the reward processor 128 for the state s received from the state processor 114 as shown in FIG. 1. It should be noted that although the present disclosure refers to the state processor 114, support policy processor 126 and reward processor 128 as separate processors, these components are not necessarily distinct physical processors. For example, the support policy processor 126 and reward processor 128 may be implemented as software executed within the RL agent 102 by a single physical processing unit.

In some embodiments as shown in FIG. 1, the reward processor 128 receives a predicted accumulated success value outputted from the GVF 106. By learning the parameters of the support policy 108 based, at least partially, on the predicted success of the main policy 104, the parameters of the support policy 108 is learned with the success of the main policy 104 in mind. Accordingly, by maximizing the reward of the support policy 108, the support policy 108 is learned to maximize the success of the main policy 104.

More specifically, the RL agent 102, at a time t, receives data characterizing the observed state $s_t$ and the reward $r_t$ of the environment. In response to each observed state $s_t$, the RL agent 102 selects and executes an action $a_t$ from an action space. One time step (t+1) later, in part as a consequence of the action $a_t$ taken by the RL agent 102, the RL agent 102 receives data characterizing the reward for the next time step, $r_{t+1}$, and the new state $s_{t+1}$ of the environment. The RL agent 102 learns the support policy 108 from state transition tuples where each state transition tuple includes the state $s_t$, the action $a_t$, the reward $r_t$ and next state $s_{t+1}$, and uses the support policy 108 to output a support 124 action given the current state to maximize the cumulative reward that is based on the predicted accumulated success value of the main policy 104. Details of learning the support policy 108 are now described.

Figure 2:
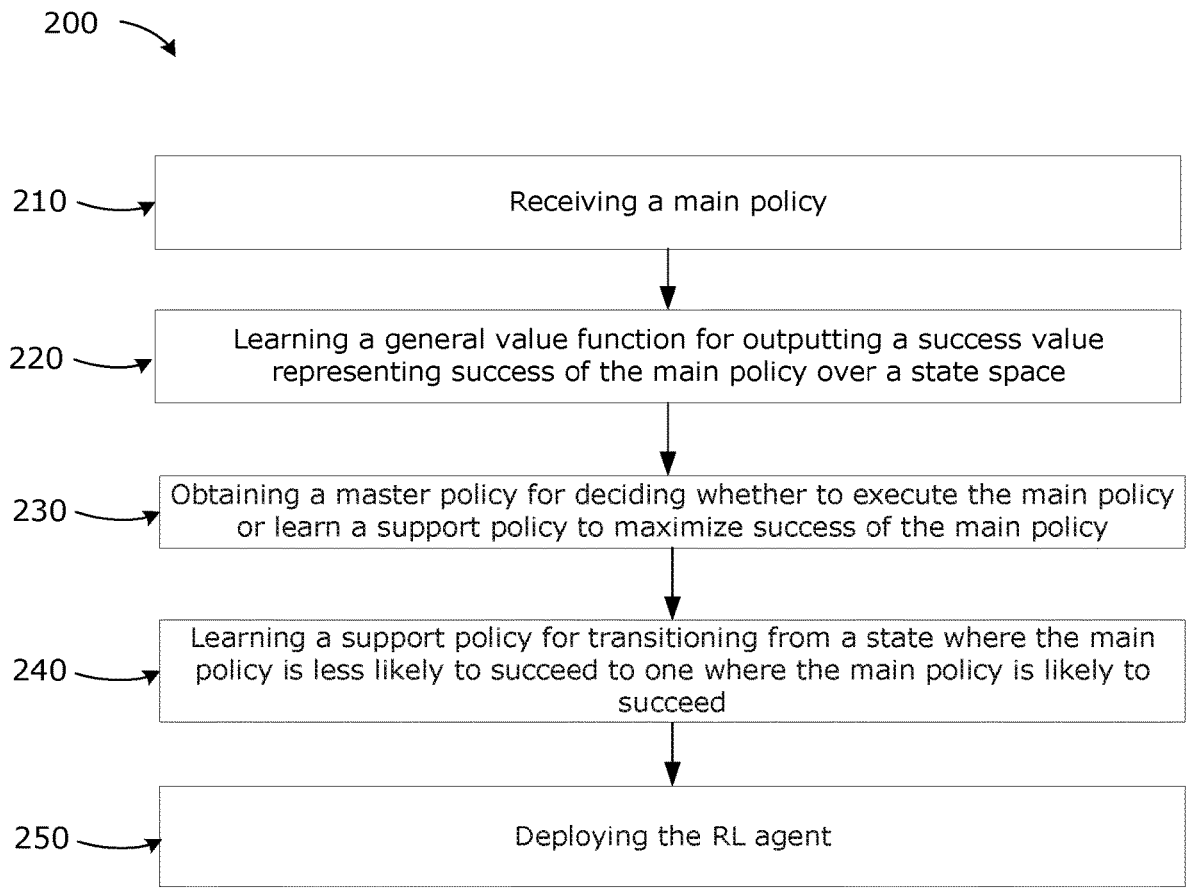
FIG. 2 is a flowchart for an example method of support policy learning, which may be implemented by a robot shown in FIG. 1.

FIG. 2 is a flowchart illustrating an example method 200 of support policy learning (e.g., learning of the support policy 108) performed by the RL agent 102 for the robot 100, in accordance with an example embodiment.

At step 210, an existing main policy 104 is received by the RL agent 102. The main policy 104, denoted by $\pi^M(s)$, maps states s to main actions a. The main policy 104 succeeds in sub-set of states L, which is a subset of the entire state space S, by generating a main action to be performed by the robot 100 in an environment based on a current state of the robot 100.

As mentioned above, the main policy 104 may be treated as a "black box". For example, the main policy 104 may be a constructed or learned solution. For example, the main policy 104 may be constructed by manually defining rules (e.g., based on empirical experience) that govern the generation of the main action 122. The performance of RL agent 102 executing the main policy 104 may be evaluated with an accumulated success value. It is to be appreciated that the accumulated success value is not determined by or related to a value function $Q^M(s, a)$ at least because the value function may be only trained on a limited state space and may not be successfully applied to the entire state space S.

At step 220, a GVF 106, denoted $G^M(s)$, is learned using a policy evaluation algorithm to identify the sub-set of states L. The value of the GVF 106 is the predicted accumulated success value, where larger values of the GVF 106 indicate that the state s could be part of the solution sub-set of states L. For example, the GVF 106 may be learned through function approximation, e.g. deep learning based on sampling performance of the main policy 104 over a plurality of states s sampled from the overall state space S (including the sub-set of states L as well as other states outside of L). The GVF 106 is configured to predict the accumulated success value representing future performance of the RL agent 102 if the master policy 110 were to always execute a main action generated by the main policy 104 for a given state in the state space S through a cumulant, where the cumulant may be a measure of the main policy 104's success. The cumulant may be considered an indication of success at a given time, and may be used by the GVF 106 as a basis for predicting accumulated future success. For example, the GVF 106 in some embodiments, $G^M(s_t)$ may predict the discounted sum of the cumulants when executing the main policy in a given state:

$$\sum_{n=0}^{\infty} \gamma_M^n c_{t+n+1}$$

where $\gamma_M \in [0,1]$ is similar to the discount factor for the support policy 108 (or other RL algorithms) and controls how far into the future the GVF 106 predicts the accumulated success value. Conceptually, this definition of the GVF 106 predicts accumulated success value by considering the sum of all future success (indicated by the cumulant c at all future time steps) when executing the main policy 104 with some discount factor to "fade out" success that is very far in the future.

In some embodiments, the learning of the GVF 106 is performed separately from the learning of the support policy 108. It is to be appreciated that the GVF 106 learning may be done through any number of suitable machine-learning techniques, including Temporal Difference (TD) estimation and Monte Carlo (MC) estimation.

Figure 3:
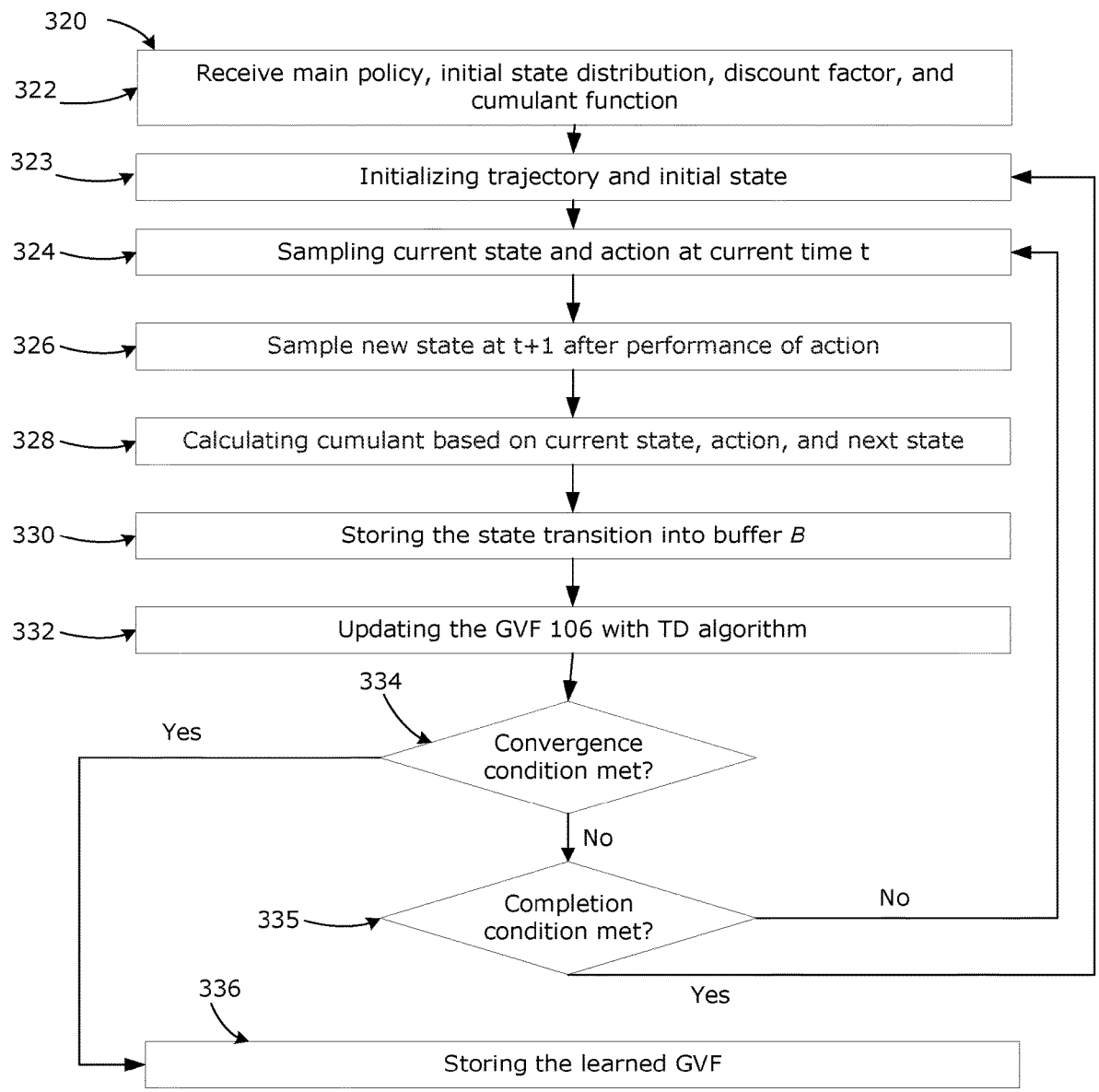
FIG. 3 is a flowchart for an example Temporal Difference learning method for leaning a General Value Function that may be implemented at step 220 in FIG. 2.

FIG. 3 shows a flowchart illustrating an example method 320 of learning the GVF 106 of step 220, using TD estimation.

At step 322, the main policy 104, initial state distribution $d_{s_0}$, discount factor $\gamma \in [0,1]$, and cumulant function $f(\bullet)$ are received. A computer-readable memory buffer B may be initialized to empty and the GVF 106, denoted by $G^M(s; \theta)$ and parameterized by $\theta$, is initialized to map state s to accumulated success value. The parameters $\theta$ may be manually selected (e.g., designed by a knowledgeable machine learning engineer), for example based on the specific task to be learned by the RL agent 102.

At step 323, the trajectory initial state is initialized. The time step is initialized to t=0, and the state of the environment is initiated to an initial state $s_0 \in S$ where $s_0 \sim d_{s_0}$.

The method 320 iteratively learns the GVF 106, denoted by $G^M(s; \theta)$, based on assessing the current state $s_t$, an action $a_t$ selected for the current time step, the next state $s_{t+1}$ at the next time step, and the cumulant $c_{t+1}$ associated with the state transition from the current state $s_t$ to the next state $s_{t+1}$.

Specifically, starting at step 324, for a current time step t, a current state $s_t$ of the environment is sampled from the state space. Based on the current state $s_t$, an action $a_t$ is sampled from the action space that includes the main actions generated by the main policy 104 for the states in the state space such that $a_t \sim \pi^M(\bullet|s_t)$.

At step 326, at one time step (t+1) later, after execution of the sampled action $a_t$, a new state $s_{t+1}$ is sampled from the state space.

At step 328, a cumulant $c_{t+1}$, which is representative of the success of the RL agent 102 in achieving a goal when executing the sampled action $a_t$ in the given state, is calculated as follows:

$$c_{t+1} = f(s_t, a_t, s_{t+1}).$$

Here, $f(\bullet)$ may be any function of the state transition from $s_t$ to $s_{t+1}$. The cumulant $c_{t+1}$ may be indicative of the success of the sampled action $a_t$.

The state transition tuple including $(s_t, a_t, c_{t+1}, s_{t+1})$ is stored in the buffer B at step 330.

At step 332, the GVF $G^M(s; \theta)$ 106 is updated based on a suitable TD learning algorithm. In one exemplary embodiment as shown in FIG. 3, a TD learning algorithm utilizing mini-batch gradient descent is used. Specifically, GVF 106, denoted by $G^M(s; \theta)$, is updated using gradient ascent with gradient $\delta_t^M \nabla_\theta G^M(s_t; \theta)$ averaged over all state transitions in a mini-batch, i.e. a portion, of data sampled from the buffer B.

Gradient descent is an optimization algorithm often used for finding the weights or coefficients of machine learning-based algorithms, such as artificial neural networks and logistic regression. Generally speaking, gradient descent works by having a model make predictions on training data and using the error of the predictions to update (and hence learn) the model in such a way as to reduce the error. Mini-batch gradient descent is a variation of the gradient descent algorithm that splits the training dataset into small batches that are used to calculate model error and update the model. In some examples, the gradient may be summered over the mini-batch which may further reduce the variance of the gradient. It should be noted that, although the present disclosure describes examples in which a buffer is used to perform mini-batch gradient descent, this is only illustrative and is not intended to be limiting. In some examples, the entire buffer may be used (instead of sampling mini-batches) to perform updating using gradient descent. In some examples, a buffer may not be used at all. Instead, the gradient of the most recent sampled state transition may be calculated to update the GVF 106 (or policy) using a suitable RL algorithm. Although the present disclosure describes embodiments that make use of a buffer in certain ways, it should be understood that other approaches for collecting and storing samples, and performing updates using those samples may be used.

In some embodiments, with the parameters $\theta$ dropped for convenience, the GVF 106 is denoted by $G^M(s_t)$ and satisfies the Bellman Equation such that the expression $c_{t+1} + \gamma G^M(s_{t+1})$ estimates the target value of the GVF $G^M(s_t)$ 106. It follows that the TD error may be calculated as:

$$\delta_t^M = c_{t+1} + \gamma G^M(s_{t+1}) - G^M(s_t).$$

Here, $\gamma$ is a future discount value $\gamma \in [0, 1]$ to be applied to the predicted accumulated success value for the new state (t+1). The TD error may then be back propagated to update the GVF $G^M(s_t)$ 106.

At step 334, a determination is made whether a convergence condition has been met. A convergence condition may be whether a predefined number of updates to the GVF 106 (at step 332) has been met (or exceeded). Another possible convergence condition may be whether a predefined desired performance level has been achieved.

Upon satisfying the convergence condition, the learned GVF 106 is outputted and stored by the RL agent 102 at step 336.

If the convergence condition is not met, then the method 320 continues to step 335, to determine whether a comple-tion condition is satisfied. By way of illustrative examples, the completion condition may be the successful completion of a certain task by the robot 100 within the environment, such as the successful parking of a vehicle or the successful pickup of a desired part from a bin by a mechanical arm. If the completion condition is not met, then the method 320 returns to step 324. If the completion condition is satisfied, the method 320 returns to step 323 to reset the trajectory with an initial state (e.g., resetting an episodic environment).

It should be noted that if the environment is non-episodic (which may be considered a special case of episodic environments), the determination of the completion condition at step 335 will always determine that the completion condition is not satisfied, hence the trajectory will never be reset (i.e., will not return to step 323).

Alternatively, the GVF 106 may be learned through supervised learning (e.g., with MC estimation), in which every state visited within a trajectory list are used to accumulate a cumulant manually. Supervised learning of GVF 106 may be advantageous for tasks with terminal rewards, e.g. success/fail, with no discount factor needed. Accordingly, in some embodiments, learning step 220 may be implemented as supervised learning.

Figure 4:
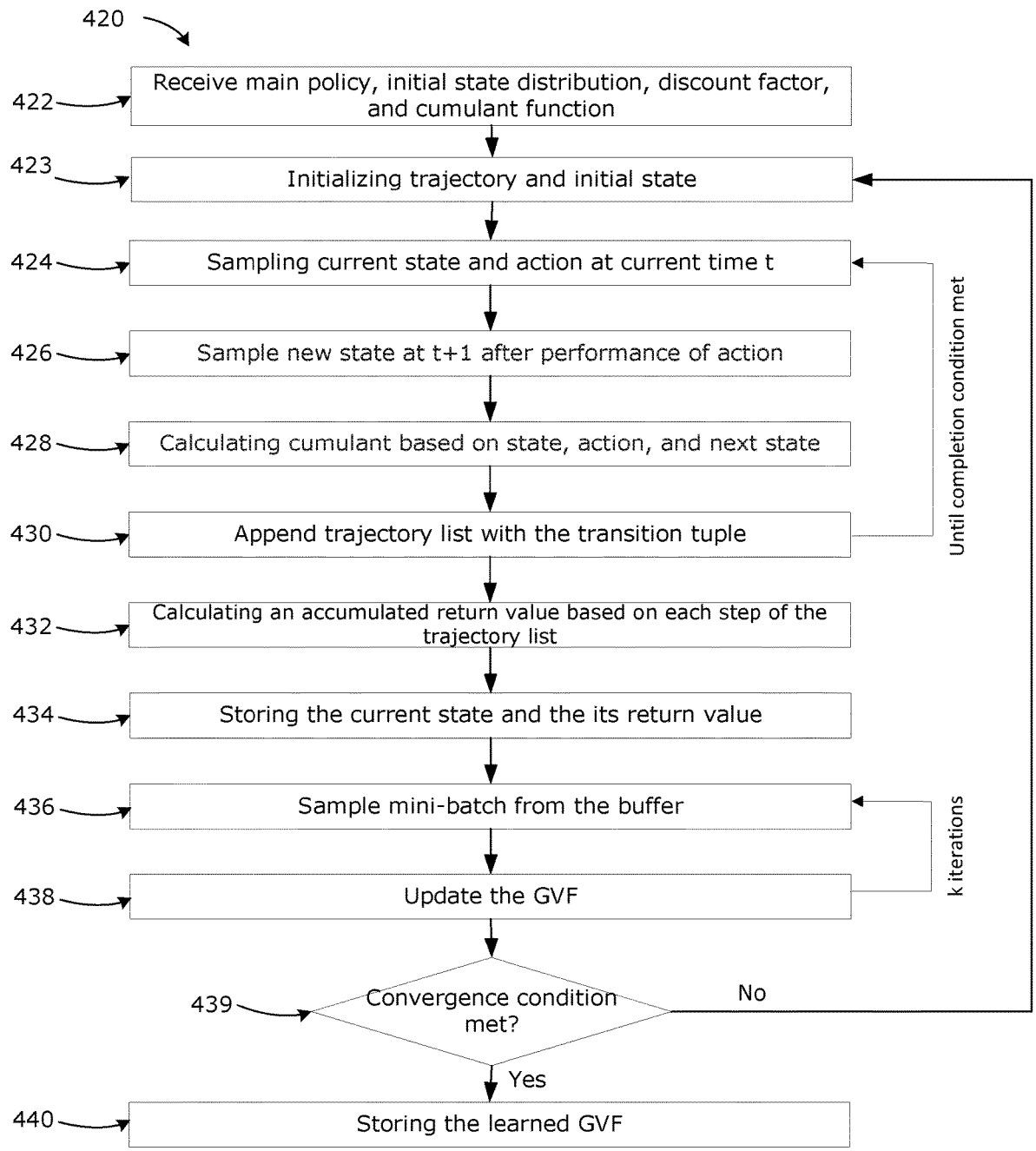
FIG. 4 is a flowchart for an example Monte Carlo supervised learning method for learning a General Value Function that may be implemented at step 220 in FIG. 2.

FIG. 4 illustrates an example method 420 for learning the GVF 106 using a MC estimation technique. In general, the MC technique relies on repeated sampling of stochastic simulations to estimate system properties. The method 420 may be useful for situations when the cumulant is terminal only (e.g., received at the end of an episode, for an episodic environment) such as a success or fail signal. However, as the target is a sampled return rather than an expected return using a boot-strapped value estimate compared to the method 320, the method 420 is known to be unbiased but with higher variance.

At step 422, the main policy 104, initial state distribution $d_{s_o}$, discount factor $\gamma \in [0,1]$, and cumulant function $f(\bullet)$ are received. A computer-readable memory buffer B may be initialized to empty and the GVF 106, denoted by $G^M(s; \theta)$ and parameterized by $\theta$, is initialized to map state s to accumulated success value. Similar to step 322, the parameters $\theta$ may be manually designed.

At step 423, the trajectory is initialized with an initial state. The time step is initialized to t=0, and the state of the environment is initiated to an initial state $s_0 \in S$ where $s_0 \sim d_{s_o}$. Differing from method 320, at the initial time t=0, the trajectory is stored in $\tau$ which is initialized to be $\tau = [s_0]$.

At step 424, for a current time step t, a current state s of the environment is sampled. Based on the current state s, an action $a_t$ is sampled from the action space that may be generated by the main policy 104 such that $a_t \sim \pi^M(\bullet | s_t)$.

At step 426, at one time step (t+1) later, after the sampled action has been performed by the robot 100 within the environment, a new state $s_{t+1}$ is sampled.

At step 428, a cumulant $c_{t+1}$, representative of the performance of the sampled action is calculated as follows:

$$c_{t+1} = f(s_t, a_t, s_{t+1}).$$

Here, $f(\bullet)$ may be any function of the state transition based on the transition from $s_t$ to $s_{t+1}$. The cumulant $c_{t+1}$ may be indicative of the success of the sampled action $a_t$.

At step 430, the cumulants are accumulated in the trajectory list $\tau$, for example by appending the trajectory list $\tau$ with the state transition tuple as $\tau + [a_t, c_{t+1}, s_{t+1}]$.

Steps 424 to 430 may be iteratively repeated until a completion condition is met. The completion condition may be the successful completion of a certain task by the robot 100 within the environment, for example.

At step 432, an accumulated reward $R_t$ (otherwise known as return) is calculated for each time step in the trajectory list as follows:

$$R_t = \sum_{n=0}^{T} \gamma^n c_{t+n+1}$$

where T is the number of time steps in one episode.

At step 434, a tuple including the state and the accumulated reward $(s_t, R_t)$ for each time step t=0 ... T−1 are stored in buffer B.

For k iterations, in each iteration, a mini-batch of n tuples is sampled from the buffer B at step 436. The parameters k and n may be manually selected. k determines the number of updates to apply to learn the GVF, after collecting a trajectory of samples.

Within each iteration, at step 438, the GVF 106, denoted by $G^M(s_t; \theta)$, is updated using gradient descent, with gradient $(G^M(s_t)-R_t)\nabla_\theta G^M(s_t; \theta)$. The gradient descent step updates parameters θ of the differentiable function $G^M(s_t; \theta)$ that minimizes the error between $G^M(s_t; \theta)$, the predicted accumulated success value determined by GVF 106, and $R_t$, the target accumulated success value collected through interaction with the environment. It may be noted that, unlike the method 320, in the method 420 an entire trajectory of samples is collected before updating the GVF.

At step 439 a determination is made whether a convergence condition has been met. A convergence condition may be whether a predefined number of updates to the GVF 106 (at step 438) has been met (or exceeded). If the convergence condition is not met, then the method 420 returns to step 423, to reset the trajectory and state (e.g., resetting an episodic environment).

Upon satisfying the convergence condition, the learned GVF 106 is stored by the RL agent 102 at step 440 (i.e. the GVF 106 with the learned parameters θ is stored by the RL agent 102).

It should be noted that method 420 depends on a completion condition being met to advance to step 432. This completion condition is not reached when the environment is non-episodic (which may be considered a special case of episodic environments). Accordingly, the method 320 described above may be more suitable when the environment is non-episodic.

The above examples describe some methods for learning the GVF 106, based on sampling performance of the main policy 104 over a plurality of sampled states in the state space. In particular, this includes sampling states in the state space for which the main policy 104 was not designed or trained to achieve an acceptable performance. Further, it may be noted that the cumulant used for training the GVF 106 may be the same or different from the reward that is calculated for the main policy 104 (in the case where the main policy 104 was also learned using RL).

In some embodiments of the method 320 or the method 420, the GVF 106 may be learned off-policy, independent of the action performed by the RL agent 102, especially when the behavior and $\pi^M(\cdot|s_t)$ probabilities are known. Various approaches may be used to learn the GVF 106 off-policy. For example, one off-policy approach is to use the importance sampling ratio ρ given by:

$$\rho = \frac{\pi^M(a|s)}{\mu(a|s)}$$

where μ(a|s) is the policy the RL agent 102 is using to sample the action at step 424. μ(a|s) may also be referred to as the behavior policy, and may be predefined. The gradient $\nabla_\theta G^M(s_t; \theta)$ is multiplied with the importance sampling ratio ρ to learn $G^M(s_t; \theta)$.

Another off-policy approach is to learn a GVF 106 that is a function of both state and action, i.e. $G^M(s_t, a_t; \theta)$. The GVF may be recovered using:

$$G^M(s_t) = G^M(s_t, a; \theta)$$

where $a \sim \pi^M(a|s)$ is an action sampled from the main policy. The TD error in the gradient descent may be modified slightly with:

$$\delta_t^M = c_{t+1} + \gamma G^M(s_{t+1}, a) - G^M(s_t, a_t)$$

where $a \sim \pi^M(a|s)$ is an action sampled from the main policy.

Referring back to FIG. 2, at step 230, a master policy 110 is obtained. The master policy 110 may be constructed (e.g., using manually-defined rules), rather than learned, in the example of method 200. In other examples discussed further below, the master policy 110 may be learned. The master policy 110 is configured to select, based on the predicted accumulated success value determined by the GVF 106 for a given state, whether to execute the main policy 104 (to cause the robot 100 to perform the main action 122) or to learn the support policy 108.

Generally, the master policy 110 is such that when the predicted accumulated success value is an acceptable value, master policy selects execution of the main policy to cause the main action 122 to be performed by the robot based on the given state in the state space.

When the predicted accumulated success value is not an acceptable value, the master policy causes the support policy 108 to be learned, using a RL algorithm, the support policy 108 generating a support action 124 to be performed by the robot 100 based on the given state. Execution of the support action causes the robot 100 to perform the support action to transition from the given state towards a new state where the predicted accumulated success value has an acceptable value. Further details are discussed below.

Because sub-set of states L where main policy 104 may succeed is unknown, the sub-set L may be constructed mathematically as follows:

$$L = \{s | \forall s \in S \; s \cdot t \cdot G^M(s) > \beta\}.$$

Here, β is a defined threshold value representative of an acceptable value of the predicted accumulated success value determined by the GVF 106. Thus, sub-set of states L consists of states where the main action 122 generated by the main policy 104 achieves a predicted accumulated success value greater than a defined threshold acceptable value. Accordingly, the master policy 110 may be defined as:

$$\pi(s) = \begin{cases} M & \text{if } s \in L \\ H & \text{otherwise} \end{cases}.$$

Here, M denotes the main policy 104, and H denotes the support policy 108.

At step 240, parameters of the support policy 108 are learned using a RL algorithm executed by the support policy processor 126. The support policy 108 maps state to support actions. The support policy 108 that maps states to support actions 124 may be modelled as a neural network. Execution of a support action 124 causes the robot 100 to perform the support action to transition from a first state that is in the unsuccessful subspace into a second state that is in the successful sub-set L. Specifically, the support policy 108 is learned with a reward generated from the reward processor 128 that is a function of the predicted accumulated success value generated from the learned GVF 106. In other words, by learning the parameters of the support policy 108 using a reward based on the success of the main policy 104, the RL agent 102 utilizing the support policy 108 may make decisions that positively affect the long term success of the main policy 104.

Figure 5:
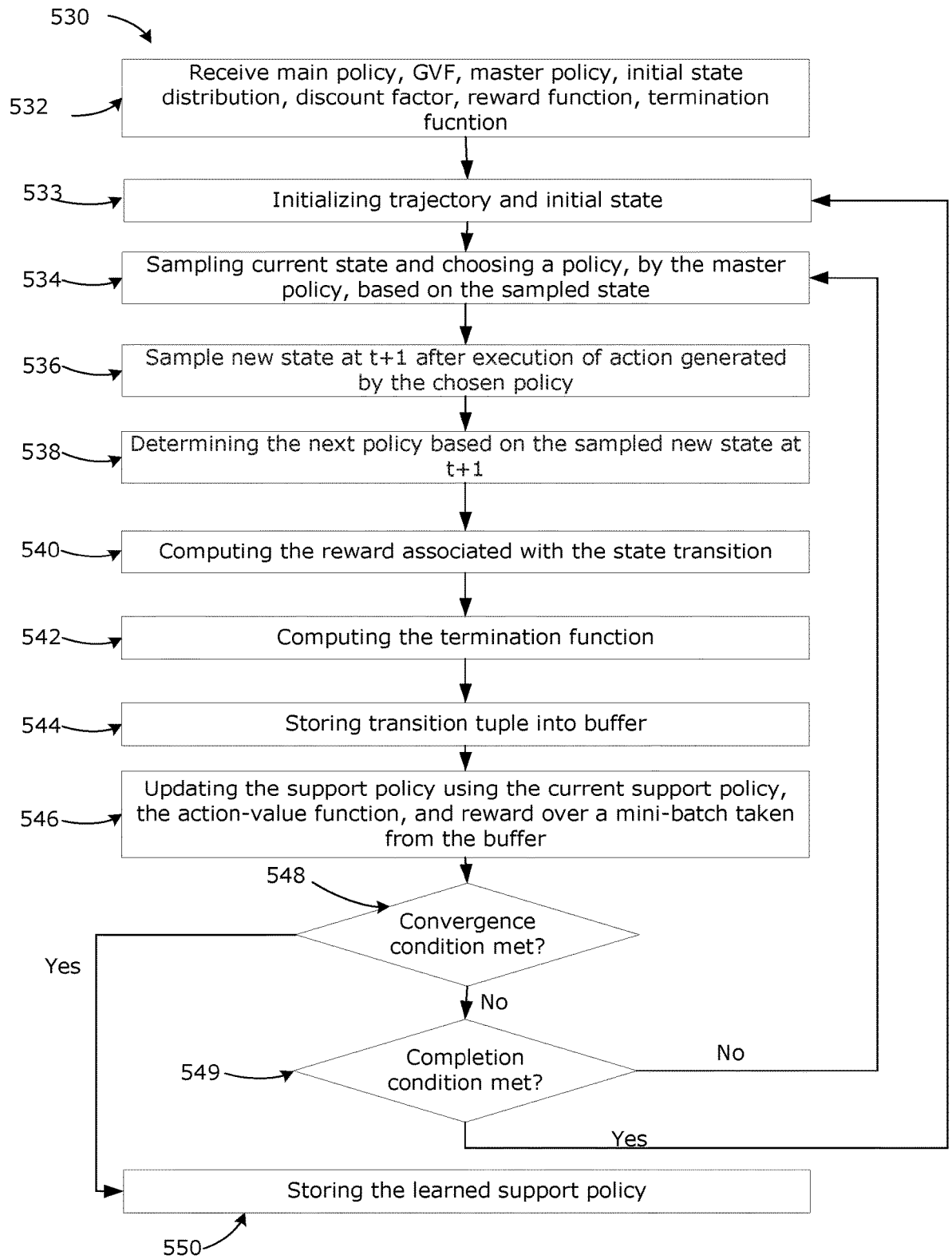
FIG. 5 is a flowchart for an example reinforcement learning method for learning a support policy that may be implemented at step 240 in FIG. 2.

FIG. 5 shows a flowchart illustrating an example method 530 for performing the support policy learning step 240.

At step 532, the main policy $\pi^M(s)$ 104, the GVF $G^M(s;\theta)$ 106, the master policy $\pi(s)$ 110, initial state distribution $d_{s_o}$ (which may be different from that of steps 322 and 422), discount factor $\gamma^H \in [0,1]$, reward function $f^H(\cdot)$, and termination function $h^H(\cdot)$ are received. A computer-readable memory buffer B may be initialized to empty. Also as part of the step 532, the support policy $\pi^H(s; \theta^{\pi^H})$ and the action value function (also referred to as the Q-function) $Q^H(s, a; \theta^{Q^H})$ are also initialized. The support policy $\pi^H(s; \theta^{\pi^H})$ 108 is configured to map state s to an action generated by the current support policy $\pi^H$, where the action may be parameterized with a set of parameters denoted with $\theta^{\pi^H}$. The function $Q^H(s, a; \theta^{Q^H})$ is the action value function which predicts the future accumulated reward of the support policy 108. The support policy $\pi^H(s; \theta^{\pi^H})$ 108 chooses actions that maximize $Q^H(s, a; \theta^{Q^H})$.

At step 533, the trajectory and state are initialized. The time step is initialized to t=0, and the state of the environment is initiated to an initial state $s_0 \in S$ where $s_0 \sim d_{s_o}$.

The support policy processor 126 then executes an RL algorithm to iteratively update or learn the parameters of the support policy 108 that maps state to support action that maximizes the accumulated reward.

In each iteration, at step 534, for a current time step t, a current state of the environment $s_t \in S$ is sampled. Based on the sampled current state, a policy, either the main policy 104 or the support policy 108, is chosen by the master policy 110. This may be mathematically represented as $\alpha_t \sim \pi(\cdot|s_t)$, where $\alpha_t \in \{H,M\}$.

Until a termination condition is met, at step 536, at one time step (t+1) later after performing an action, a new state $s_{t+1}$ is sampled. The action $a_t$ that is performed is either the main action 122 generated by either the main policy 104 or the support action 124 support policy 108, depending on the policy chosen by the master policy 110 in step 534. This may be represented mathematically as follows:

If $\alpha_t = H$ then $a_t \sim \pi^H(\cdot|s_t)$

Else if $\alpha_t = M$ then $a_t \sim \pi^M(\cdot|s_t)$

At step 538, a next policy $\alpha_{t+1}$ based on the new sampled state $s_{t+1}$ is determined by the master policy (mathematically represented as $\alpha_{t+1} \sim \pi(\cdot|s_{t+1})$).

At step 540, a reward, denoted $r_{t+1}^H$, is computed according to the reward function. The reward function, denoted $f^H(\cdot)$, calculates the reward using the state transition tuple (defined as the tuple $(s_t, a_t, \alpha_t, s_{t+1}, \alpha_{t+1})$) as well as the predicted accumulate success values (as calculated by the GVF 106) of the initial state (denoted as $s_t$) and the next state (denoted as $s_{t+1}$). The reward function may be represented mathematically as follows:

$$r_{t+1}^H = f^H(s_t, a_t, \alpha_t, s_{t+1}, \alpha_{t+1}, G^M(s_t), G^M(s_{t+1})).$$

It is to be appreciated that the reward function $f^H(\cdot)$ may also be a function of other features in the state transition tuple $(s_t, a_t, s_{t+1})$ which may include reward shaping and other terms to improve learning of the support policy. Here, an explicit dependence on the predicted accumulated success value of the main policy 104 for the two successive states, namely $G^M(s_t)$ and $G^M(s_{t+1})$, is imposed. By way of non-limiting examples, the reward function $f^H(\cdot)$ may be chosen from the following:

$$r_{t+1}^H = G^M(s_{t+1}) - \gamma_{t+1}^H G^M(s_t), \text{ or}$$

$$r_{t+1}^H = G^M(s_{t+1})(1 - \gamma_{t+1}^H) \text{ or}$$

$$r_{t+1}^H = G^M(s_t, a_t)(1 - \gamma_{t+1}^H) \text{ when } G^M(s_t, a_t) \text{ is action-conditioned or}$$

$$r_{t+1}^H = \begin{cases} 1 & \text{if episode completed and } \alpha_t = M \\ 1 & \text{if episode not completed and } \alpha_{t+1} = M \\ 0 & \text{otherwise} \end{cases}.$$

Other examples of the reward function that also depend on the predicted accumulated success value of the main policy 104 are possible. In some further embodiments, the reward function may be modified with reward shaping specific to the support policy. Reward shaping adds small rewards or penalties to the reward of the RL agent 102 in order to guide the agent 102 towards the desired final state. As an example, suppose the RL agent 102 is learning to park a vehicle. Achieving the desired outcome of parking the vehicle successfully may be unlikely from random behavior alone. Reward shaping gives hints that the agent 102 is closer to achieving its goal such as rewarding the agent 102 for moving closer or penalizing the agent 102 for moving farther away from the parking stall.

At step 542, the termination variable is determined using the termination function. An example of the termination function $h^H(\cdot)$ is as follows:

$$\gamma_{t+1}^H = \begin{cases} 0 & \text{if } \alpha_{t+1} = M \\ \gamma^H & \text{otherwise} \end{cases}.$$

Here, if the chosen policy is the main policy 104 (which may indicate that the RL agent 102 has transitioned to a state where the master policy 110 deems the main policy 104 is likely to succeed), then the support policy 108 is terminated. But it should be noted that the agent 102 still interacts with the environment using the main policy 104 until the end of an episode in the environment (e.g., because the goal was reached) or until the chosen policy changes to the support policy 108 in which case the main policy 104 is terminated (which may indicate the master policy 110 deems the main policy 104 is no longer likely to succeed).

Otherwise (e.g., the master policy 110 deems, given the current state, that further support policy 108 execution is needed), the termination is set to the discount factor which may be used to discount the reward as shown above, as the iterations continue.

At the step 544, the state transition tuple including $(s_t, a_t, \alpha_t, r_{t+1}^H, \gamma_{t+1}^H, s_{t+1})$ is stored into the buffer B.

At step 546, the support policy processor 126 updates the support policy 108. Specifically, the support policy 108, denoted by $\pi^H(s; \theta^{\pi^H})$, and the action-value function $Q^H(s, a; \theta^{Q^H})$, along with reward $r^H$, are calculated over a mini-batch sampled from buffer B using any off-policy RL algorithm, such as Q-Learning.

At step 548, a determination is made whether a convergence condition has been met. A convergence condition may be whether a predefined number of updates (at step 546) has been met (or exceeded). Another possible convergence condition may be whether a predefined desired performance level has been achieved. Upon satisfying the convergence condition, the learned support policy 108 is stored by the RL agent 102 at step 550.

If the convergence condition is not met, then the method 530 continues to step 549, to determine whether a completion condition is satisfied. By way of illustrative examples, the completion condition may be the successful completion of a certain task by the robot 100 within the environment, such as the successful parking of a vehicle or the successful pickup of a desired part from a bin by a mechanical arm.

If the completion condition is not met, then the time step t is updated so that the current state is now the previously sampled new state (i.e., set t=t+1) and the method 530 returns to step 534.

If the completion condition is satisfied, the method 530 returns to step 533 to reset the trajectory and state (e.g., resetting an episodic environment).

It should be noted that if the environment is non-episodic (which may be considered a special case of episodic environments), the completion condition may never be satisfied in the determination at step 549, and there may not be any return to step 533 to reset the trajectory.

Figure 6:
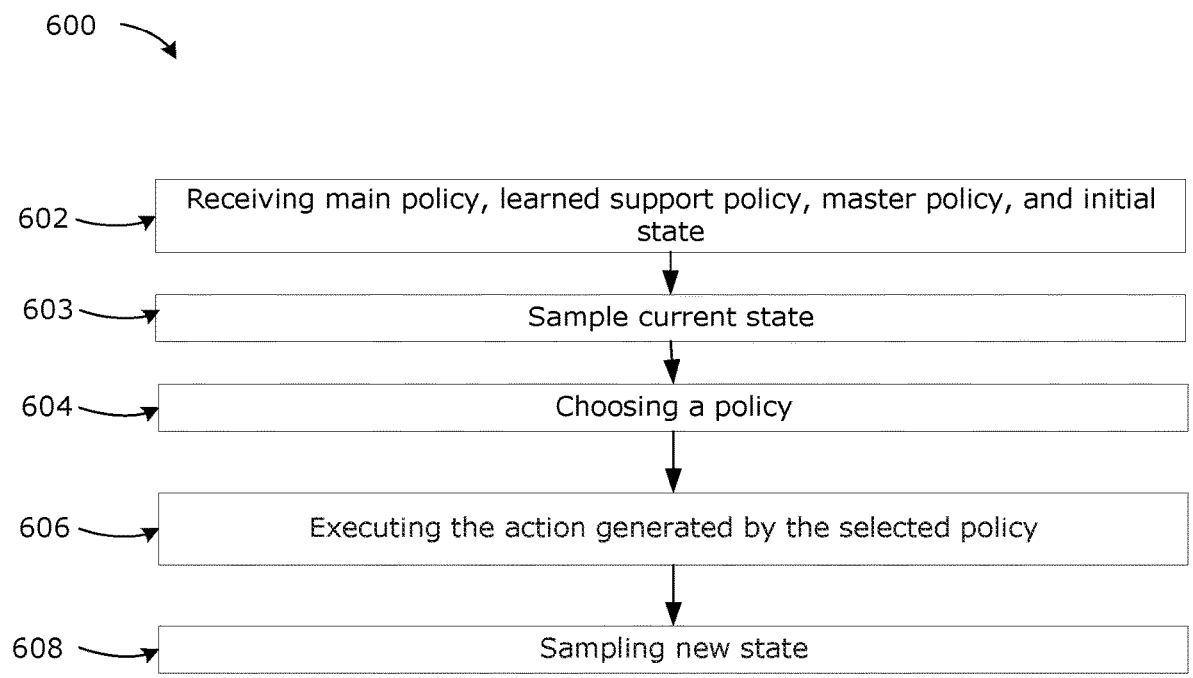
FIG. 6 is a flowchart for an example deployment method, which may be implemented by the RL agent shown in FIG. 1.

Referring back to FIG. 2, at step 250, after the GVF and support policy have been learned, the RL agent 102 may be deployed. FIG. 6 shows a flowchart of one exemplary deployment method 600.

At step 602, the main policy 104, the learned support policy 108, the implemented master policy 110, and an initial state $s_0$ for an initial time t=0 are received.

At step 603, data representing a current state of the environment at time t is obtained. For example, the state $s_t$ may be received from the state processor 114.

At step 604, given the current state at time t, a decision $\alpha_t$ is made by the master policy 110 such that $\alpha_t \sim \pi(\cdot|s_t)$ where $\alpha_t \in \{H, M\}$. As mentioned above, the decision is made to select between execution of the main policy 104 and the support policy 108, and is based, at least in part, on the predicted accumulated success value of the main policy 104 for the particular state $s_t$. Accordingly, the step 604 may include determining the predicted accumulated success value of the main policy 104 using the learned GVF.

Execution of the selected policy generates an action based on the current state and cause the action to be performed by the robot 100 within the environment. The action $a_t$ may be the main action 122 ($a_t \sim \pi^H(\cdot|s_t)$) if the main policy 104 was chosen ($\alpha_t=M$), or alternatively be the support action 124 ($a_t \sim \pi^M(\cdot|s_t)$) if the support policy 108 was chosen ($\alpha_t=H$).

At step 606, the action $a_t$ for given state $s_t$, is executed by the RL agent 102. As discussed above, the RL agent 102 executes an action by outputting the action to the controller(s) 116, which in turn generates one or more control signals to the actuators 118, to cause the robot 100 to perform the action.

In an example where the master policy 110 is not learned, the master policy 110 may select between the main policy 104 and the support policy 108 by performing a comparison of the predicted accumulated success value against a predefined threshold. When the comparison indicates the predicted accumulated success value has an acceptable value, the master policy 110 causes output of the main action output generated by the main policy. When the comparison indicates the predicted accumulated success value has an unacceptable value, the master policy 110 causes output of the support action output generated by the support policy.

At step 608, the new state is sampled from the state space after execution of action $a_t$ (e.g., after the action has been performed by the robot 100). The time step is also updated to t=t+1.

The above-described examples may enable expanding the utility and generality of a fixed main policy. Unlike known methods of transfer learning that rely on the details of main policy being at least partially known (i.e., a white or gray box), the SPL, in accordance with the present disclosure, may function with black box main policies. This may be advantageous as it may enable the building of hybrid systems that are capable of best utilizing both constructed and learned solutions. It may also be an advantage for learned main policies since it is easier to learn policies in a smaller problem space before expanding the agent to a more complex and larger problem space.

Figure 7:
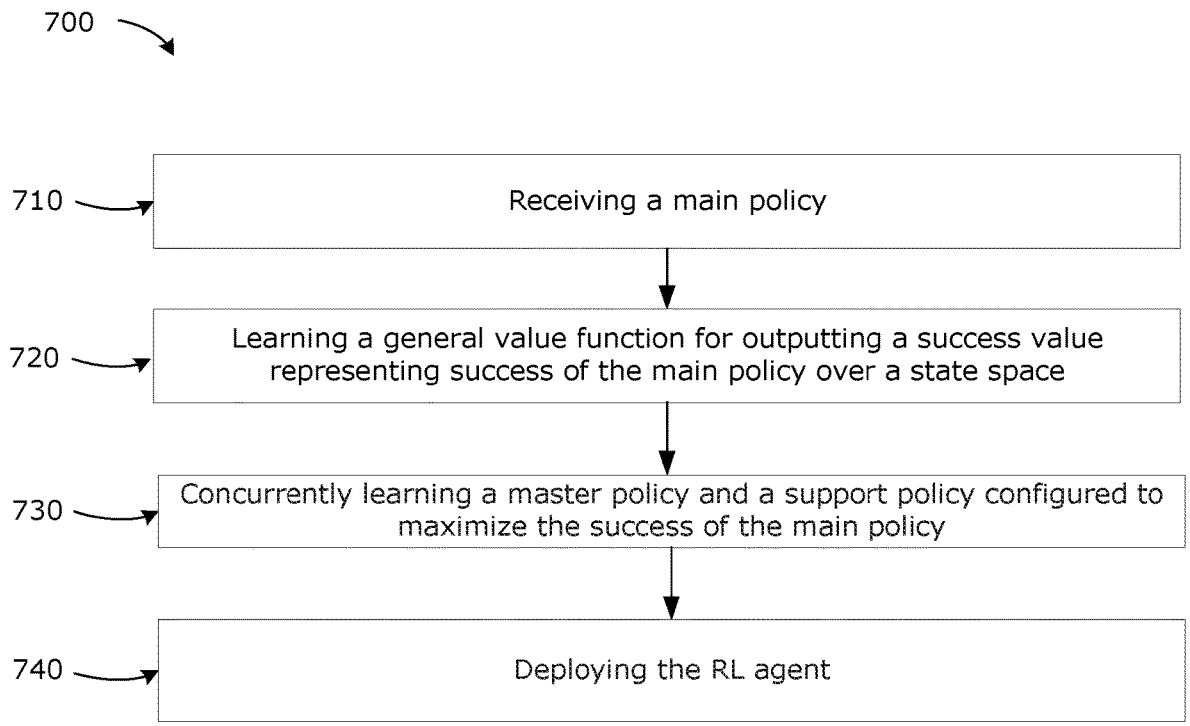
FIG. 7 is a flowchart for another example method of support policy learning, which may be implemented by a robot shown in FIG. 1 that combines master policy learning and support policy learning into a single concurrent step.

As previously mentioned, the master policy 110 may be learned in some examples. FIG. 7 shows a flowchart for an example method 700 of SPL for the robot 100 in accordance with another example embodiment of the present disclosure, in which the master policy 110 is learned.

The method 700 may be similar to the method 200 except for the learning of the master policy 110 and the support policy 108. More specifically, instead of implementing the master policy 110 (e.g., a rules-based master policy 110) and learning the support policy 108 sequentially, both policies 108, 110 are learned and the learning is carried out concurrently. In this example method 700, step 710 for receiving a main policy, step 720 for learning the GVF 106, and step 740 for deploying the RL agent, may be similar to steps 210, 220, and 250 of method 200, respectively, and will not be described here in detail for brevity.

Figure 8:
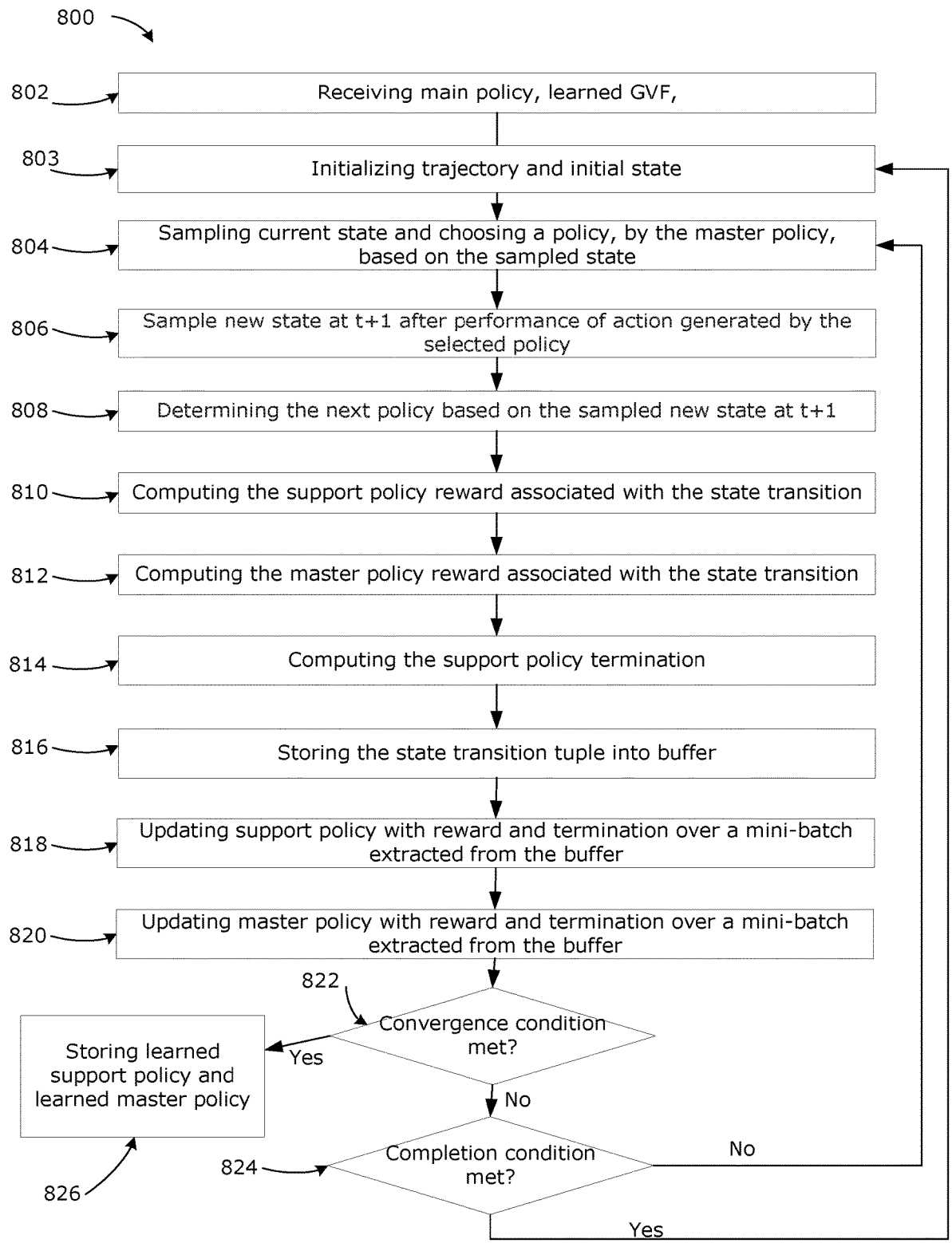
FIG. 8 is a flowchart for an example reinforcement learning method for concurrently learning the master policy and support policy that may be implemented at step 730 in FIG. 7.

At step 730, the master policy 110 and the support policy 108 are learned concurrently. FIG. 8 shows a flow chart of an example method 800, which may be used for performing step 730.

Referring to FIG. 8, at step 802, the main policy 104, denoted by $\pi^M(s)$ and the learned GVF 106, denoted by $G^M(s; \theta)$ (from step 720) are received along with an initial state distribution $d_{s_o}$ (which may be different from that used in step 720). A support policy discount factor $\gamma^H \in [0,1]$ and a master policy discount factor $\gamma \in [0,1]$ are also received. A computer-readable memory buffer B is set to empty. Among the received parameters, there includes a support policy reward function $f^H(\cdot)$, a master policy reward function $f^\pi(\cdot)$, and support policy termination function $h^H(\cdot)$. Upon reception, parameters $\pi^H(s; \theta^{\pi^H})$, $Q^H(s, a; \theta^{Q^H})$, $\pi(s; \theta^\pi)$, $Q^\pi(s, \alpha; \theta^Q)$ are initialized (e.g., initialized to random).

At step 803, the trajectory and state are initialized. The time step is initialized to t=0, and the state of the environment is initialized to an initial state $s_0 \in S$ where $s_0 \sim d_{s_o}$.

For generality, the master policy $\pi(s)$ may be a function of multiple GVFs and states including part or all of the observations of the environment at time t, a history of the observations or a collection of the accumulated success predictions $G_1^M(s), G_2^M(s) \ldots G_N^M(s)$ instead of just one, possibly with different cumulants and discounts for each GVF.

At step 804, at a current time step t, a current state $s_t$ is sampled. Based on the current state $s_t$, a decision $\alpha_t$ is determined by the master policy as $\alpha_t \sim \pi(\cdot|s_t)$ where the decision $\alpha_t$ is execution the main policy 104 or to learn the support policy 108 (i.e., $\alpha_t \in \{H, M\}$). If execution of the main policy 104 was selected by the master policy 110 ($\alpha_t=M$), the main policy 104 is executed to generate the main action 124 ($a_t \sim \pi^M(\cdot|s_t)$) to be performed by the robot 100. Alternatively, if learning the support policy 108 was selected by the master policy 110 ($\alpha_t=H$), then the support policy 108 is executed to generate the support action 126 ($a_t \sim \pi^H(\cdot|s_t)$) to be performed by the robot 100.

At step 806, a new state is sampled at a time step later at t+1 after performing the decision action $\alpha_t$.

At step 808, based on the sampled new state $s_{t+1}$, a new decision $\alpha_{t+1} \sim \pi(\cdot|s_{t+1})$ is determined by the master policy 110.

At step 810, a support policy reward $r_{t+1}^H$ associated with the state transition, including the predicted accumulate success values of the initial state $s_t$ and the next state $s_{t+1}$, is computed, by the reward processor 128, using the support policy reward function $f^H(\cdot)$ as follows:

$$r_{t+1}^H = f^H(s_t, a_t, \alpha_t, s_{t+1}, \alpha_{t+1}, G^M(s_t), G^M(s_{t+1})).$$

At step 812, a master policy reward $r_{t+1}^\pi$ associated with the state transition, including the predicted accumulate success values of the initial state $s_t$ and the next state $s_{t+1}$, is computed using the master policy reward function $f^\pi(\cdot)$ as follows:

$$r_{t+1}^\pi = f^\pi(s_t, a_t, \alpha_t, s_{t+1}, \alpha_{t+1}, G^M(s_t), G^M(s_{t+1})).$$

It is to be appreciated that the reward functions $f^H(\cdot)$ and $f^\pi(\cdot)$ are both functions of the predicted accumulated success value of the main policy as determined by the GVF 106. The master policy reward function $f^\pi(\cdot)$ may be different from and independent of the support policy reward function $f^H(\cdot)$. Accordingly, there may be separate reward processors for the separate reward functions. For example, instead of the single reward processor 128 illustrated in FIG. 1, there may be two separate reward processors (or two instances of the reward processor) to generate rewards for the support policy 108 and the main policy 104 respectively.

It is to be appreciated also that the reward functions $f^H(\cdot)$ and $f^\pi(\cdot)$ may be functions of other features in the state transition ($s_t, a_t, s_{t+1}$) which may include reward shaping and other terms to improve learning of the respective policies. For example, $f^\pi(\cdot)$ may include rewards terms that reduce frequency of switching between the support policy 108 and the main policy 104. Example functions for $f^\pi(\cdot)$ include (among other possibilities):

$$r_{t+1}^\pi = G^M(s_{t+1}) - \gamma G^M(s_t)$$

or $$r_{t+1}^\pi = \begin{cases} G^M(s_{t+1}), & \text{if episode terminated} \\ G^M(s_{t+1})(1-y) & \text{otherwise} \end{cases}$$

or $$r_{t+1}^\pi = \begin{cases} G^M(s_t, a_t) & \text{if episode completed} \\ G^M(s_t, a_t)(1-\gamma) & \text{otherwise} \end{cases}$$

At step 814, a support policy termination $\gamma_{t+1}^H = h^H(s_t, a_t, \alpha_t, s_{t+1}, \alpha_{t+1})$ is calculated as $\gamma_{t+1}^H = h^H(s_t, a_t, \alpha_t, s_{t+1}, \alpha_{t+1})$. Examples of the termination function $h^H(\cdot)$ may be similar to those described at step 542 of the method 530.

At step 816, the state transition tuple of ($s_t, a_t, \alpha_t, r_{t+1}^H, \gamma_{t+1}^H, r_{t+1}^\pi, s_{t+1}$) is stored within buffer B.

At step 818, the support policy 108, denoted by $\pi^H(s; \theta^{\pi^H})$, and its action value function $Q^H(s, a; \theta^{Q^H})$ are updated off-policy with reward $r^H$ and termination $\gamma_{t+1}^H$ over a mini-batch sampled from buffer B. This may be achieved by using any off-policy RL algorithm (e.g., Q-learning, or off-policy gradient methods such as Deep Deterministic Policy Gradient (DDPG) and Soft-Actor Critic (SAC) methods).

At step 820, the master policy 100, denoted by $\pi(\cdot|s_t; \theta^\pi)$, and its action value function $Q^\pi(s, \alpha; \theta^Q)$ are updated with reward $r^\pi$ over a mini-batch sampled from buffer B. This may be achieving with any suitable RL algorithm, for example.

At step 822, a determination is made whether a convergence condition has been met. A convergence condition may be whether a predefined number of updates (at steps 818 and 820) has been met (or exceeded). Another possible convergence condition may be whether a predefined desired performance level (for the support policy, or the master policy, or both) has been achieved. Upon satisfying the convergence condition, the learned support policy 108 and the learned master policy 110 are stored by the RL agent 102 at step 826.

If the convergence condition is not met, then the method 800 continues to step 824, to determine whether a completion condition is satisfied. By way of illustrative examples, the completion condition may be the successful completion of a certain task by the robot 100 within the environment, such as the successful parking of a vehicle or the successful pickup of a desired part from a bin by a mechanical arm.

If the completion condition is not met, then the time step t is updated so that the current state is now the previously sampled new state (i.e., set t=t+1) and the method 800 returns to step 804.

If the completion condition is satisfied, the method 800 returns to step 803 to reset the trajectory and state (e.g., resetting an episodic environment).

It should be noted that if the environment is non-episodic (which may be considered a special case of episodic environments), the completion condition may never be satisfied in the determination at step 824, and there may not be any return to step 803 to reset the trajectory.

In some examples, off-policy approaches have been described for learning a policy (e.g., with respect to methods 520 and 820). It should be understood that on-policy approaches may be used instead of off-policy approaches. To use an on-policy approach for learning a support policy, for example, samples may be stored only for the iterations when the support policy was executed and the policy may be updated after a sufficient number of samples is collected in one or more trajectories (i.e., the trajectory list may replace the role of the buffer). A similar approach may be used for an on-policy approach to learn the master policy.

Referring back to FIG. 7 and as mentioned above, deployment step 740 may be similar to step 250 of the method 200.

In addition to the possible advantages described above, the example where the master policy 110 is learned may obviate the need for a success threshold value $\beta$ to be set, which may permit the master policy decision making to be more optimal, to better maximize the success of the main policy. Additionally, such an approach may also allow for more complex decision making, for example to avoid potential flip-flopping (between selecting the main policy or the support policy for example) as a result of some local noise or inaccuracies in the learned GVF 106, denoted by $G^M(s)$. By learning the master policy 110 from a part or all of the observations, historical observations, or from a collection of predictions $G_1^M(s), G_2^M(s) \ldots G_N^M(s)$ possibly with different cumulants and discount factors for multi-objective tasks, a more complex decision making can be made, to help ensure the optimal support policy is chosen so that the success of the main policy is maximized.

Figure 9:
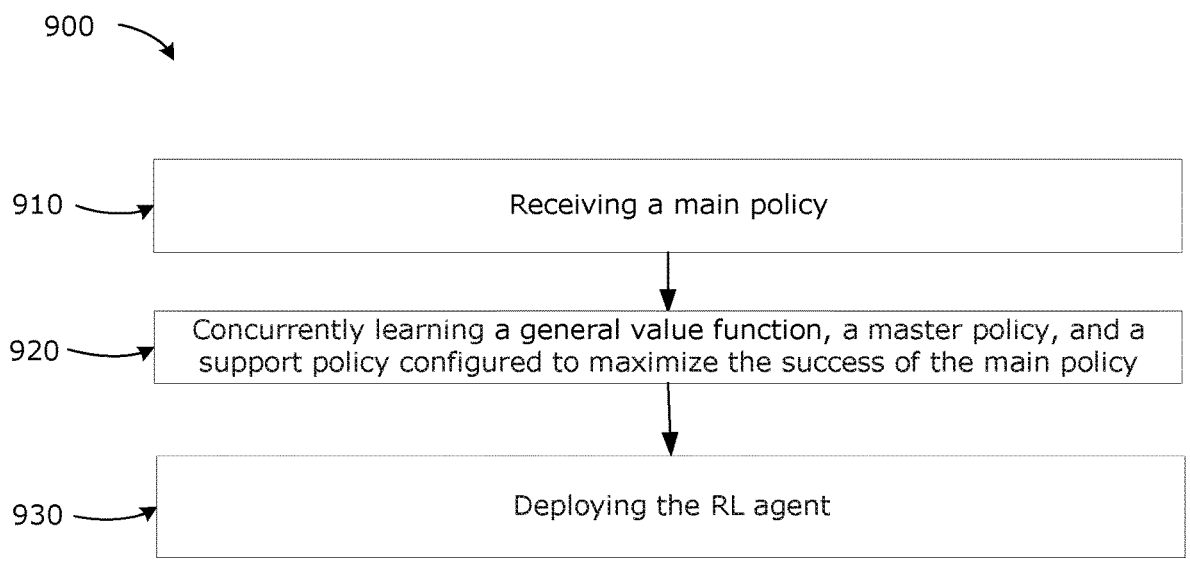
FIG. 9 is a flowchart for yet another example method of support policy learning, which may be implemented by a robot shown in FIG. 1 that combines general value function learning, master policy learning and support policy learning into a single concurrent step.

FIG. 9 shows a flowchart for another method 900 of SPL for the robot 100, where the master policy 110 is learned in accordance with another example embodiment of the present disclosure.

The method 900 may be similar to the method 200 except for the way the GVF 106, the master policy 110, and the support policy 108 are learned. Step 910 for receiving a main policy and step 930 for deploying the RL agent may be similar to steps 210 and 250 of method 200, respectively, and will not be described here in detail for brevity.

Figure 10:
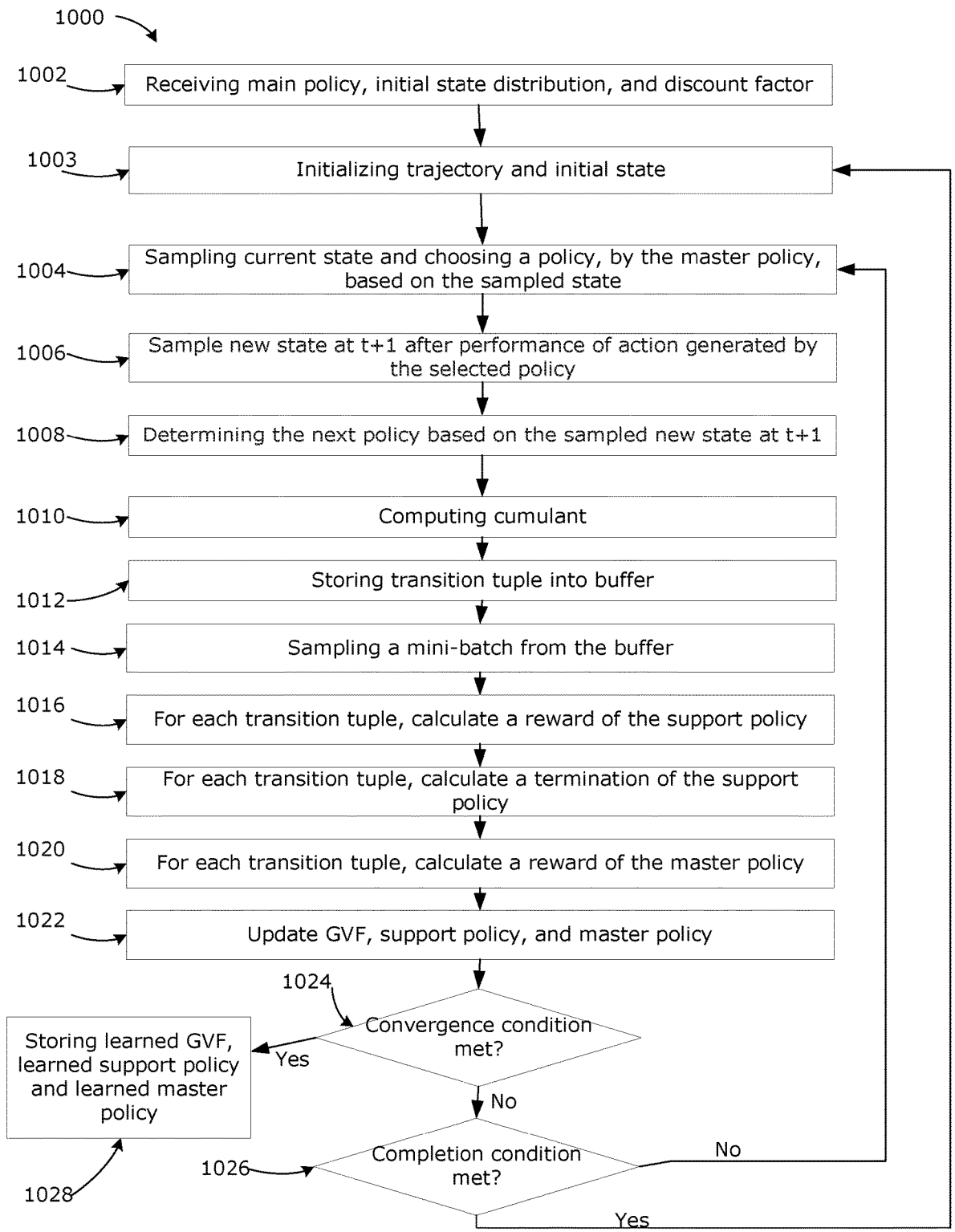
FIG. 10 is a flowchart for an example reinforcement learning method for concurrently learning the general value function, the master policy and the support policy that may be implemented at step 920 in FIG. 9.

At step 920, instead of learning the GVF 106 separately from the master policy 110 and the support policy 108 as was done in methods 200 and 700, the GVF 106 is concurrently learned with both of the master policy 110 and the support policy 108. FIG. 10 shows a flow chart of an example method 1000, which may be used for performing step 920.

Referring to FIG. 10, at step 1002, the main policy 104, denoted by $\pi^M(s)$, is received along with an initial state distribution $d_{s_o}$. A discount factor $\gamma \in [0,1]$ is also received. A computer-readable memory buffer B is set to empty. Among the received parameters $\theta$, there includes a cumulant function $f(\cdot)$, a support policy reward function $f^H(\cdot)$, and a master policy reward function $f^\pi(\cdot)$. The GVF $G^M(s, a; \theta)$, support policy $\pi^H(s; \theta^{\pi^H})$, support policy action value function $Q^H(s, a; \theta^{Q^H})$, master policy $\pi(\cdot|s; \theta^\pi)$, and master policy action value function $Q^\pi(s, \alpha; \theta^Q)$ are initialized (e.g., initialized to random).

At step 1003, the trajectory and state are initialized. The time step is initialized to t=0, and the state of the environment is initiated to an initial state $s_0 \in S$ where $s_0 \sim d_{s_o}$.

Similar to the method 700, the master policy 110, more simply denoted by $\pi(\cdot|s)$, may be a function of multiple GVFs and states including part or all of the observations of the environment at time t, a history of the observations or a collection of the accumulated success predictions $G_1^M(s)$, $G_2^M(s) \ldots G_N^M(s)$ instead of just one, possibly with different cumulants and discounts for each GVF.

At step 1004, at a current time step t, a current state $s_t$ is sampled from the overall state space S. Based on the current state $s_t$, a decision $\alpha_t$ is determined by the master policy 110 as $\alpha_t \sim \pi(\cdot|s_t)$ where the decision is to select one of the main policy or the support policy (i.e., $\alpha_t \in \{H, M\}$) for execution. Execution of the selected policy by RL agent 102 includes generating an action by the selected policy and executing the action. The action may be the main action 124 ($a_t \sim \pi^M(\cdot|s_t)$) generated by the main policy 104 based on the current state if the main policy 104 was chosen as the selected policy ($\alpha_t = M$), or alternatively the action may be the support action 126 ($a_t \sim \pi^H(\cdot|s_t)$) generated by the support policy 108 based on the current state if the support policy 108 was chosen ($\alpha_t = H$).

At step 1006, a new state is sampled at a time step later at t+1 after the decision action $\alpha_t$ has been performed in the environment.

At step 1008, based on the sampled new state $s_{t+1}$, a new decision $\alpha_{t+1} \sim \pi(\cdot|s_{t+1})$ is determined by the master policy 110.

At step 1010, a cumulant $c_{t+1}$, which may be representative of the performance of the sampled action is calculated as follows:

$$c_{t+1} = f(s_t, a_t, s_{t+1}).$$

Here, $f(\cdot)$ may be any function of the state transition from $s_t$ to $s_{t+1}$. The cumulant $c_{t+1}$ may be indicative of the success of the sampled action $a_t$. The sampled action $a_t$ is sampled from the action space generated by the main policy 104 (i.e., $a_t \sim \pi^M(\cdot|s_t)$) or the support policy 108 ($a_t \sim \pi^H(\cdot|s_t)$), based on the decision by the master policy 110. The reward functions $f^H(\cdot)$ and $f^\pi(\cdot)$ may also be a function of other features in the state transition ($s_t, a_t, s_{t+1}$) which may include reward shaping and other terms to improve learning of the respective policies. For example, $f^\pi(\cdot)$ may include rewards terms that reduce frequency of switching between support policy and main policy (e.g., to avoid flip-flopping).

At step 1012, the state transition tuple ($s_t, a_t, \alpha_t, c_{t+1}, s_{t+1}, \alpha_{t+1}$) is stored into the buffer B.

At step 1014, a mini-batch is sampled from the buffer B.

For each state transition tuple within the mini-batch, compute a reward of the support policy at step 1016 as a function of the predicted accumulated success value of the main policy 104 as well as the decision policies as determined by the master policy as follows:

$$r_{t+1}^H = f^H(s_t, a_t, \alpha_t, s_{t+1}, \alpha_{t+1}, G^M(s_t, \hat{a}_t), G^M(s_{t+1}, \hat{a}_{t+1})),$$

Here, $\hat{a}_t$ denotes the main action 122 generated by the main policy 104 for state $s_t$ such that $\hat{a}_t \sim \pi^M(\cdot|s_t)$, and the main action 122 generated for the next time step t+1 is $\hat{a}_{t+1}$ such that $\hat{a}_{t+1} \sim \pi^M(\cdot|s_{t+1})$.

In addition, for each state transition tuple within the mini-batch, a termination is calculated for support policy 108 at step 1018 as follows:

$$\gamma_{t+1}^H = h^H(s_t, a_t, \alpha_t, s_{t+1}, \alpha_{t+1}).$$

Further, for each state transition tuple within the mini-batch, a reward associated with the master policy 110 is calculated at step 1020 as follows:

$$r_{t+1}^\pi = f^\pi(s_t, a_t, \alpha_t, s_{t+1}, \alpha_{t+1}, G^M(s_t, \hat{a}_t), G^M(s_{t+1}, \hat{a}_{t+1})).$$

Upon completion of steps 1016 to 1020 for all transition tuples in the mini-batch, each of the GVF 106, support policy 108, and the master policy 110 are updated at step 1022.

Specifically, the GVF 106, denoted by $G^M(s_t, a_t; \theta)$ may be updated using gradient ascent with gradient calculated by $\delta_t^M \nabla_\theta G^M(s_t, a_t; \theta)$ averaged over all transition tuples in the mini-batch. The TD error, which may be back propagated to adjust the GVF may be calculated as:

$$\delta_t^M = c_{t+1} + \gamma G^M(s_{t+1}, \hat{a}_{t+1}) - G^M(s_t, a_t)$$

Here, $\hat{a}_{t+1} \sim \pi^M(\cdot|s_{t+1})$ is the sampled next action from the main policy.

The support policy 108, denoted by $\pi^H(s; \theta^{\pi^H})$, and its corresponding action-value function $Q^H(s, a; \theta^{Q^H})$ may be updated off-policy with reward $r^H$ found at step 1016 and the termination $\gamma_{t+1}^H$ found at step 1018 over the mini-batch using any suitable off-policy approach (e.g., Q-learning, DDPG, SAC, etc.).

The master policy 110, denoted by $\pi(\cdot|s; \theta^\pi)$ and its action-value function $Q^\pi(s, \alpha; \theta^Q)$ may be updated with the reward $r^\pi$ calculated at step 1022 over the mini-batch using any suitable RL algorithm.

At step 1024, a determination is made whether a convergence condition has been met. A convergence condition may be whether a predefined number of updates to the GVF 106, support policy 108 and master policy 110 (at step 1022) has been met (or exceeded). Another possible convergence condition may be whether a predefined desired performance level (for the support policy, or the master policy, or both) has been achieved. Upon satisfying the convergence condition, the learned GVF 106, the learned support policy 108 and the learned master policy 110 are stored by the RL agent 102 at step 1028.

If the convergence condition is not met, then the method 1000 continues to step 1026, to determine whether a completion condition is satisfied. By way of illustrative examples, the completion condition may be the successful completion of a certain task by the robot 100 within the environment, such as the successful parking of a vehicle or the successful pickup of a desired part from a bin by a mechanical arm.

If the completion condition is not met, then the time step t is updated so that the current state is now the previously sampled new state (i.e., set t=t+1) and the method 1000 returns to step 1004.

If the completion condition is satisfied, the method 1000 returns to step 1003 to reset the trajectory and state (e.g., resetting an episodic environment).

It should be noted that if the environment is non-episodic (which may be considered a special case of episodic environments), the completion condition may never be satisfied in the determination at step 1026, and there may not be any return to step 1003 to reset the trajectory.

Referring back to FIG. 9 and as mentioned above, deployment step 930 may be similar to step 250 of the method 200.

In addition to the possible advantages previously discussed, the method 900 combines all of the learning (of the GVF, the support policy and the master policy) into a single algorithm, thereby advantageously allowing the learning algorithm to be more data efficient. It is to be noted that because the reward of the support policy is continuously changing as the support policy is being learned, this approach may result in more challenging tuning of the learning for the support and master policies. The GVF 106, denoted by $G^M(s)$, may be learned more quickly because it is simply policy evaluation with a fixed policy.

As mentioned above, in some examples, the present disclosure may apply to a multi-objective optimization problem where multiple GVF functions $G_1^M(s)$, $G_2^M(s)$ and $G_N^M(s)$ with possibly different cumulants or different discount factors are needed to assess the success of the main policy in accomplishing multiple objectives.

In some embodiments, the master policy 110 may be based on a learned threshold. In such embodiments, the master policy 110 may be considered a learned master policy 110, as opposed to a purely constructed master policy 110, where the master policy 110 is a hybrid of the threshold-based constructed policy (e.g., as described with respect to FIG. 5) and the fully-learned policy (e.g., as described with respect to FIG. 10).

The hybrid master policy 110 may be defined as follows:

$$\pi(s) = \begin{cases} M & G^M(s_t) \geq G^\pi(s_t) - \varepsilon \\ H & \text{otherwise} \end{cases}$$

where a second GVF, denoted $G^\pi(s_t)$, is learned. The second GVF may also be referred to as the master policy GVF, to distinguish from the GVF 106 (which may also be now referred to as the main policy GVF 106, denoted $G^M(s_t)$, which is learned for the main policy as discussed previously. Instead of learning the entire master policy 110, the master policy GVF 106 learns to predict the future accumulated success value of executing the master policy 110 in a given state. When executing the master policy 110 in a given, the master policy 110 selects and executes the main policy 104 when the predicted accumulated success value of the main policy GVF, $G^M(s_t)$, is greater than or equal to the predicted accumulated success value of the master policy GVF, $G^\pi(s_t)$, in a given state sampled from the state space, and selects and learns the support policy 108 in all other states. The master policy GVF, $G^\pi(s_t)$, predicts the accumulated success value of the master policy 110. As an example, the master policy GVF may predict the accumulated success value of executing the support policy 108 (denoted as H) and then switching to executing the main policy 104 (denoted as M) when the predicted accumulated success value of the main policy GVF, $G^M(s_t)$, is greater than or equal to the predicted accumulated success value of the master policy GVF, $G^\pi(s_t)$ in a given state. Thus, the master policy GVF, $G^\pi(s_t)$, provides a different prediction than the main policy GVF 106 ($G^M(s_t)$) (which predicts the future accumulated success value for the main policy 104). In the above equation, parameter $\varepsilon \geq 0$ is some very small fixed value that is introduced to account for the fact that typically computers cannot represent floating point numbers accurately.

The master policy GVF, $G^\pi(s_t)$, is learned using a cumulant similar to the master policy reward $r_{t+1}^\pi$ discussed above with respect to FIG. 10. However, there is a difference in the cumulant, denoted as $c_{t+1}^\pi$, used to learn the master policy GVF, $G^\pi(s_t)$, (and hence the cumulant for learning the master policy GVF, $G^\pi(s_t)$, should not be considered equivalent to a reward as discussed with respect to FIG. 10). The cumulant used to learn the master policy GVF, $G^\pi(s_t)$, may be referred to as the master policy cumulant.

For example, the master policy cumulant may be mathematically represented as follows:

$$c_{t+1}^\pi = G^M(s_t, a_t)(1 - \gamma_{t+1}^H) \text{ where } \gamma_{t+1}^H = \begin{cases} 0 & \text{if } a_{t+1} = M \\ \gamma^H & \text{otherwise} \end{cases}$$

where the $\gamma_{t+1}^H$ is the support policy termination and computed at step 1018, also denotes the termination of the master policy GVF prediction. By introducing $\gamma_{t+1}^H$, the master policy GVF, $G^\pi(s_t)$, predicts the same accumulated success value as the main policy, GVF $G^M(s_t)$, when the master policy 110 selects the main policy 104 to be executed in a given state. This allows the master policy GVF, $G^\pi(s_t)$, to be compared with the main policy GVF, 106 ($G^M(s_t)$). In another example, another possible master policy cumulant for learning the master policy GVF, $G^\pi(s_t)$, may be mathematically represented as follows:

$$c_{t+1}^\pi = G^M(s_{t+1}, a) - G^M(s_t, a_t)\gamma_{t+1}^H \text{ where } a \sim \pi^M(\cdot|s_{t+1})$$

The master policy GVF, $G^\pi(s_t)$, may be learned similarly to how the main policy GVF 106, $G^M(s_t)$, is learned (as discussed above), based on sampling an action from the action space of the main policy 104. The main policy 104 may be learned using the TD error:

$$\delta_t^M = c_{t+1} + \gamma G^M(s_{t+1}, a) - G^M(s_t, a_t)$$

where $a \sim \pi^M(\cdot|s_{t+1})$ is an action sampled from the action space defined as the possible main actions generated by the main policy 104.

Using a similar approach, the master policy GVF 106, $G^\pi(s_t)$, can be learned using the following TD error:

$$\delta_t^\pi = c_{t+1}^\pi + \gamma_{t+1}^H G^\pi(s_{t+1}, a) - G^\pi(s_t, a_t)$$

where $a \sim \pi^H(\cdot|s_{t+1})$ is an action sampled from the support policy 108 and $\gamma_{t+1}^H$ is computed at step 1018.

Generally, it may be desirable for the master policy GVF, $G^\pi(s_t)$, to approximate $\Sigma_{n=0}^\infty \gamma_M^n c_{t+1}$ for cumulants computed at step 1010 when collected under the master policy 110 in order to be directly comparable with the GVF 106 of the main policy 104 (where the master policy GVF 106, $G^\pi(s_t)$, for the main policy 104 approximates $\Sigma_{n=0}^\infty \gamma_M^n c_{t+n+1}$ for the same cumulants computed at step 1010 when collected under the main policy 104, as discussed previously).

Notably, unlike the main policy GVF 106, $G^M(s_t)$, discussed previously (which is used to predict the accumulated success value of the main policy 104), the master policy GVF, $G^\pi(s_t)$, is used to predict the accumulated success value of master policy 110 that includes switching between execution of the support policy 108 or the main policy 104.

An example method for learning the hybrid master policy described above may be considered a variation of the method 1000 of FIG. 10. For ease of understanding, only the differences with respect to the method 1000 are discussed here.

At step 1002, in addition to what was previously described with respect to FIG. 10, the parameter ε (which is used in defining the hybrid master policy) is also received, and the master policy GVF is initialized.

Steps 1003 to 1018 may be carried out similarly to that described previously with respect to FIG. 10.

At step 1020, instead of calculating a reward of the master policy, the master policy cumulant ($c_{t+1}^\pi$, as described above) for learning the master policy GVF is calculated.

At step 1022, instead of updating master policy 110 (together with updating the support policy 108 and the GVF 106 of the main policy 104 as described with respect to FIG. 10), the master policy GVF is updated.

Steps 1024 and 1026 may be carried out similarly to that described previously with respect to FIG. 10.

At step 1028, instead of storing the learned master policy 110 (along with storing the learned support policy 108 and the learned GVF 106 of the main policy 104 as described with respect to FIG. 10), the learned master policy GVF, $G^\pi(s_t)$, is stored. The learned master policy GVF, $G^\pi(s_t)$, may then be used as a "learned threshold" in the hybrid master policy.

In another possible embodiment, the master policy cumulant may be defined to be the same cumulant as that calculated at step 1010, that is:

$$c_{t+1} = f(s_t, a_t, s_{t+1}).$$

The update to the master policy GVF, $G^\pi(s_t)$, may then be performed using:

$$\delta_t^\pi = c_{t+1} + \gamma G^\pi(s_{t+1}, a) - G^\pi(s_t, a_t)$$

where a is either the next main action (generated by the main policy 104) or the next support action (generated by the support policy 108) depending on the selection by the master policy 110 in the next state $s_{t+1}$.

In this embodiment, step 1020 is no longer needed to calculate the master policy cumulant, because the cumulant calculated at step 1010 is used instead. Using this approach may be conceptually understood to mean that the master policy GVF, $G^\pi(s_t)$, predicts the performance of the master policy 110.

In various examples, the present disclosure describes methods and systems for support policy learning. An RL agent (which may be implemented in a robot) is provided with an existing solution in the form of a main policy 104 which generates a main action to be performed by the robot to produce a desired result in solving a task or achieving a goal within an environment. The performance of the RL agent executing the main policy is measured by an accumulated success value. The RL agent is configured to learn a general value function for predicting the accumulated success value representing a future performance of the agent executing the main policy for a given state in the state space. The RL agent is further configured to learn a support policy for transitioning from a state where the accumulated success value is less than or equal to an acceptable value to a state where the accumulated success value is greater than the acceptable value. The support policy may be learned from state transitions (represented by state, action, reward, and next state tuples) to maximize a cumulative reward, where the reward is a function of the accumulated success value of the main policy. The RL agent implements or learns a master policy that chooses, based on the predicted accumulated success value as determined by the general value function, whether to execute the main policy or the support policy for a given state within the environment.

By utilizing both the existing main policy and the learned support policy (based on selection by the master policy), the RL agent may advantageously extend known solutions to an end-to-end solution for a broader state space within the environment.

In some examples, tabular rasa learning may be avoided as existing solutions to simpler tasks in the form of the main policy are transferred and reused in tackling more complex tasks within the same environment.

The RL agent implemented in accordance with examples disclosed herein may be immune to catastrophic forgetting as existing solutions are retained and fixed.

The RL agent implemented in accordance with examples disclosed herein may flexibly adopt existing solutions as a black box with no assumptions on whether the solution was constructed (e.g., hand engineered) or learned. Additionally, no assumptions need to be imposed on the structure of the sub-set of the state space where the known solution is successful.

By being able to work with black box main policies, examples of the present disclosure may enable the RL agent to be built as a hybrid system taking advantage of both constructed and learned solutions.

In some example embodiments, the RL agent is configured so that the reward associated with the support policy learning is a function of a predicted accumulated success value of the main policy as determined by the general value function. Thus, the way in which the policies are implemented in the present disclosure is different from traditional hierarchical reinforcement learning (HRL). Typically, traditional HRL divides a complex task into a number of simpler and independent sub-tasks with the goal of learning the optimal sequence in which the sub-tasks are executed. In contrast, the master policy in accordance with the present disclosure, in at least one aspect, aims to maximize the performance of the main policy. Thus, the SPL in accordance with examples of the present disclosure may build policies with imposed dependencies between the support and master policy that do not exist in HRL. These dependencies may advantageously allow for adapting black box main policies in such a way that permits seamless transition between support and main policies. In HRL, there is no explicit inter-policy support as there are no explicit policy dependencies.

In some embodiments, the SPL in accordance with the present disclosure aims to learn how to utilize a main policy effectively from states that were not originally part of the design protocol or learning environment for that main agent. In at least one aspect, the SPL aims to improve the performance, generality and efficiency of a main policy by learning a support policy as a function of the success of the main policy, thereby creating a direct dependency between the support policy such that the support policy supports the performance of the main policy.

In some embodiments, the RL agent learns a GVF separate from the support policy learning.

In some embodiments, the support policy and the master policy are learned concurrently. By learning the master policy (instead of the master policy being rules-based), an accumulated success value threshold may not be set. Further, a learned master policy may permit more complex decision-making, by, for example, avoiding potential flip-flopping that may result from some local noise or inaccuracies in the learned GVF.

In some embodiments, the GVF, the support policy, and the master policy are learned concurrently, which may achieve higher data efficiency.

In some example aspects, an example method is described, which may be performed by an agent of a robot that controls the robot to interact with an environment. The method includes: receiving a given state of the environment; determining, using a general value function that is learned for a given main policy, a predicted accumulated success value representing future performance of the main policy for the given state; determining, using a master policy, whether to choose the main policy or a learned support policy, by performing a comparison of the predicted accumulated success value against a predefined threshold: when the comparison indicates the predicted accumulated success value has an acceptable value, executing the main policy to cause the robot to perform a main action generated by the main policy based on the given state; or when the comparison indicates the predicted accumulated success value has an unacceptable value, executing the support policy to cause the robot to perform a support action generated by the support policy based on the given state, wherein executing the support policy causes the robot to transition from the given state towards a new state in which the predicted accumulated success value has an acceptable value.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method performed by a robot having an agent that controls one or more actuators of the robot to cause the robot to interact with an environment, the method comprising:
   the agent receiving a main policy, the main policy generating an action to be performed by the robot based on a state of the environment including the robot, wherein performance of the agent executing the main policy is measured by an accumulated success value;
   the agent learning, for the main policy, a general value function using a policy evaluation algorithm, the general value function predicting the accumulated success value representing future performance of the agent executing the main policy for any state of the environment in an overall state space representing all possible states of the environment;
   the agent obtaining a master policy which selects an action based on the predicted accumulated success value received from the general value function; and
   the agent controlling actuation of the robot in a given state by:
      executing the master policy to select one of executing the main policy or learning a support policy, based on the predicted accumulated success value received from the general value function for the current state;
      the master policy selecting an action to execute the main policy by sending control signals to cause the one or more actuators of the robot to perform a main action generated by the main policy based on the given state in the state space, when the predicted accumulated success value is an acceptable value; and
      the master policy selecting an action to learn the support policy using a reinforcement learning algorithm when the predicted accumulated success value is not an acceptable value, the support policy generating a support action to be performed by the robot by sending control signals to cause the one or more actuators of the robot to perform the support action, based on the given state, causing the robot to transition from the given state towards a new state where the predicted accumulated success value has an acceptable value and in which execution of the main policy is predicted to be successful.

2. The method of claim 1, wherein learning the general value function using a policy evaluation algorithm comprises:
   performing a plurality of iterations, each iteration comprising:
      sampling an action generated by the main policy, based on a current state in the state space, the action being executed by the agent to cause the robot to perform the action;
      sampling a next state in the state space, after execution of the action;

computing a cumulant based on a transition from the current state to the next state, given the execution of the action, wherein the cumulant is representative of the success value of the agent in the current state; and storing at least the cumulant in association with the current state, the action, and the next state; and updating the general value function to predict the accumulated success value.

3. The method of claim 2, wherein the general value function is updated using temporal difference learning or Monte Carlo estimation.

4. The method of claim 1, wherein the support policy is learned based on rewards that are based on the predicted accumulated success value received from the general value function, over a plurality of states sampled from the state space.

5. The method of claim 1, wherein obtaining the master policy comprises determining a threshold value, and wherein the master policy is defined to select the main policy to be executed when the success value outputted by the general value function passes the threshold value, and is further defined to cause the support policy to be learned when the success value outputted by the general value function fails to pass the threshold value.

6. The method of claim 1, wherein obtaining the master policy comprises learning the master policy together with learning of the support policy, the learning of the master policy being based on a master policy reward and the learning of the support policy being based on a support policy reward, the master policy reward and the support policy reward each being separately based on the predicted accumulated success value received from the general value function.

7. The method of claim 6, wherein the general value function, the master policy and the support policy are learned concurrently.

8. A robot comprising a processing unit, the processing unit executing machine-executable instructions to implement an agent to control one or more actuators of the robot to cause the robot to interact with an environment, the instructions causing the robot to:
   at the agent, receive a main policy, the main policy generating an action to be performed by the robot based on a state of the environment including the robot, wherein performance of the agent executing the main policy is measured by an accumulated success value;
   at the agent, learn, for the main policy, a general value function using a policy evaluation algorithm, the general value function predicting the accumulated success value representing future performance of the agent executing the main policy for any state of the environment in an overall state space representing all possible states of the environment;
   at the agent, obtain a master policy which selects an action based on the predicted accumulated success value received from the general value function; and
   at the agent, control actuation of the robot in a given state by:
      executing the master policy to select one of executing the main policy or learning a support policy, based on the predicted accumulated success value received from the general value function for the current state;
      the master policy selecting an action to execute the main policy by sending control signals to cause the one or more actuators of the robot to perform a main action generated by the main policy based on the given state in the state space, when the predicted accumulated success value is an acceptable value; and
      the master policy selecting an action to learn the support policy using a reinforcement learning algorithm when the predicted accumulated success value is not an acceptable value, the support policy generating a support action to be performed by the robot by sending control signals to cause the one or more actuators of the robot to perform the support action, based on the given state, causing the robot to transition from the given state towards a new state where the predicted accumulated success value has an acceptable value and in which execution of the main policy is predicted to be successful.

9. The processing unit of claim 8, wherein the instructions cause the agent to learn the general value function by:
   performing a plurality of iterations, each iteration comprising:
      sampling an action generated by the main policy, based on a current state in the state space, the action being executed by the agent to cause the robot to perform the action;
      sampling a next state in the state space, after execution of the action;
      calculating a cumulant based on a transition from the current state to the next state, given the execution of the action, wherein the cumulant is representative of the success value of the agent in the current state; and
      storing at least the cumulant in association with the current state, the action, and the next state; and
   updating the general value function using temporal difference learning.

10. The processing unit of claim 9, wherein the general value function is updated using temporal difference learning or Monte Carlo estimation.

11. The processing unit of claim 8, wherein the support policy is learned based on rewards that are based on the predicted accumulated success value received from the general value function, over a plurality of sampled states in the state space.

12. The processing unit of claim 8, wherein the instructions cause the agent to obtain the master policy by determining a threshold value, and wherein the master policy is defined to select the main policy to be executed when the success value outputted by the general value function passes the threshold value, and is further defined to cause the support policy to be learned when the success value outputted by the general value function fails to pass the threshold value.

13. The processing unit of claim 8, wherein the instructions cause the agent to obtain the master policy by learning the master policy together with learning of the support policy, the learning of the master policy being based on a master policy reward and the learning of the support policy being based on a support policy reward, the master policy reward and the support policy reward each being separately based on the predicted accumulated success value received from the general value function.

14. The processing unit of claim 13, wherein the instructions cause the agent to learn the general value function, the master policy and the support policy concurrently.

15. A non-transitory computer readable medium having instructions stored thereon, wherein the instructions, when executed by a robot having an agent that controls one or more actuators the robot to cause the robot to interact with the environment, cause the robot to:

- at the agent, receive a main policy, the main policy generating an action to be performed by the robot based on a state of the environment including the robot, wherein performance of the agent executing the main policy is measured by an accumulated success value;
- at the agent, learn, for the main policy, a general value function using a policy evaluation algorithm, the general value function predicting the accumulated success value representing future performance of the agent executing the main policy for any state of the environment in an overall state space representing all possible states of the environment;
- at the agent, obtain a master policy which selects an action based on the predicted accumulated success value received from the general value function; and
- at the agent, control actuation of the robot in a given state by:
  - executing the master policy to select one of executing the main policy or learning a supporting policy, based on the predicted accumulated success value received from the general value function for the current state;
  - the master policy selects an action to execute the main policy by sending control signals to cause the one or more actuators of the robot to perform a main action generated by the main policy based on the given state in the state space, when the predicted accumulated success value is an acceptable value; and
  - the master policy selects an action to learn the support policy using a reinforcement learning algorithm when the predicted accumulated success value is not an acceptable value, the support policy generating a support action to be performed by the robot by sending control signals to cause the one or more actuators of the robot to perform the support action, based on the given state, causing the robot to transition from the given state towards a new state where the predicted accumulated success value has an acceptable value and in which execution of the main policy is predicted to be successful.

16. The computer readable medium of claim 15, wherein the instructions cause the agent to learn the general value function by:

performing a plurality of iterations, each iteration comprising:
- sampling an action generated by the main policy, based on a current state in the state space, the action being executed by the agent to cause the robot to perform the action;
- sampling a next state in the state space, after execution of the action;
- calculating a cumulant based on a transition from the current state to the next state, given the execution of the action, wherein the cumulant is representative of the success value of the agent in the current state; and
- storing at least the cumulant in association with the current state, the action, and the next state; and updating the general value function using temporal difference learning.

17. The computer readable medium of claim 16, wherein the general value function is updated using temporal difference learning or Monte Carlo estimation.

18. The computer readable medium of claim 15, wherein the support policy is learned based on rewards that are based on the predicted accumulated success value received from the general value function, over a plurality of sampled states in the state space.

19. The computer readable medium of claim 15, wherein the instructions cause the agent to obtain the master policy by determining a threshold value, and wherein the master policy is defined to select the main policy to use when the success value outputted by the general value function passes the threshold value, and is further defined to select the support policy to use when the success value outputted by the general value function fails to pass the threshold value.

20. The computer readable medium of claim 15, wherein the instructions cause the agent to obtain the master policy by learning the master policy together with learning of the support policy, the learning of the master policy being based on a master policy reward and the learning of the support policy being based on a support policy reward, the master policy reward and the support policy reward each being separately based on the predicted accumulated success value received from the general value function.

* * * * *